United States Patent
Frijns et al.

(10) Patent No.: US 6,592,297 B2
(45) Date of Patent: Jul. 15, 2003

(54) UNDERWATER PIPE LAYING METHOD AND APPARATUS

(75) Inventors: Tom Laurent Hubert Frijns, Den Haag (NL); Anne Klaas de Groot, Odijk (NL)

(73) Assignee: Heerema Marine Contractors Nederland B.V. (NL)

( * ) Notice: Subject to any disclaimer, the term of this patent is extended or adjusted under 35 U.S.C. 154(b) by 0 days.

(21) Appl. No.: 09/842,530

(22) Filed: Apr. 25, 2001

(65) Prior Publication Data

US 2002/0159839 A1 Oct. 31, 2002

(51) Int. Cl.$^7$ ................................................. F16L 1/12
(52) U.S. Cl. ..................... 405/170; 405/169; 405/154.1; 405/166
(58) Field of Search ................................. 405/166, 169, 405/170, 168.1, 168.2, 168.4, 158, 154.1

(56) References Cited

U.S. PATENT DOCUMENTS

| | | | |
|---|---|---|---|
| 2,696,835 A | | 12/1954 | Kaiser |
| 5,181,798 A | * | 1/1993 | Gilchrist, Jr. ............... 405/156 |
| 5,421,675 A | * | 6/1995 | Brown et al. ............... 405/158 |
| 5,575,590 A | * | 11/1996 | Drost et al. ............... 405/166 |
| 6,142,359 A | | 11/2000 | Corbishley et al. |
| 6,149,347 A | * | 11/2000 | Scott ......................... 405/158 |
| 6,273,643 B1 | * | 8/2001 | Baugh ....................... 405/158 |
| 6,293,732 B1 | * | 9/2001 | Baugh ....................... 405/166 |
| 6,352,388 B1 | * | 3/2002 | Seguin ...................... 405/166 |
| 6,361,250 B1 | * | 3/2002 | de Varax ................... 405/158 |
| 6,364,573 B1 | * | 4/2002 | Baugh ....................... 405/165 |

FOREIGN PATENT DOCUMENTS

| | | | | |
|---|---|---|---|---|
| GB | 2 322 423 B | | 8/1998 | |
| GB | 2 335 722 A | | 9/1999 | |
| GB | 2 336 191 A | | 10/1999 | |
| GB | 2 339 251 A | | 1/2000 | |
| GB | 2339251 A | * | 1/2000 | ............. F16L/1/19 |
| WO | WO 99 08825 A | | 2/1999 | |
| WO | WO 00/005525 A2 | | 2/2000 | |

OTHER PUBLICATIONS

"Laybarge converted for Service in deepwater West African fields"; Deepwater Technology Archive, Aug. 1998, from www.pipe–line.com/archive/archive_98–08_dwt/98–08_dwt_laybarge–borelli.html.*

"Brief Overview of Gulf of Mexico OCS Oil and Gas Pipelines: Installation, Potential Impacts, and Mitigation Measures" OCS Report MMS 2001–067, US Dept of Interior, Aug. 2001.*

Harry Van Der Heijden, and Peter Butler, "Installation of an Internally Clad Pipeline Using the J–Lay Method," OTC 7016, Offshore Technology Conference, p. 8, (Jul. 18, 1992).

* cited by examiner

Primary Examiner—James R. Brittain
Assistant Examiner—Katherine Mitchell
(74) Attorney, Agent, or Firm—Fulwider Patton Lee & Utecht, LLP

(57) ABSTRACT

A method and apparatus for near vertical laying of a pipeline offshore by a pipe laying vessel includes a tower to which is attached a strongback that load pipe sections from a supply point on the vessel into the tower where the lower end of the pipe section is welded onto the upper end of a pipe line that extends into the sea while the strongback returns to the supply point for a second pipe joint. Where the pipe section includes a bulky item such as a valve assembly box, after the pipe section has been welded to the pipeline the pipe section is moved generally horizontally out of the tower and a hoisting cable lowers the pipe section to a predetermined depth below the tower. The hoisting cable then returns the pipe section and attached pipeline to their original position.

20 Claims, 22 Drawing Sheets

FIG. 3
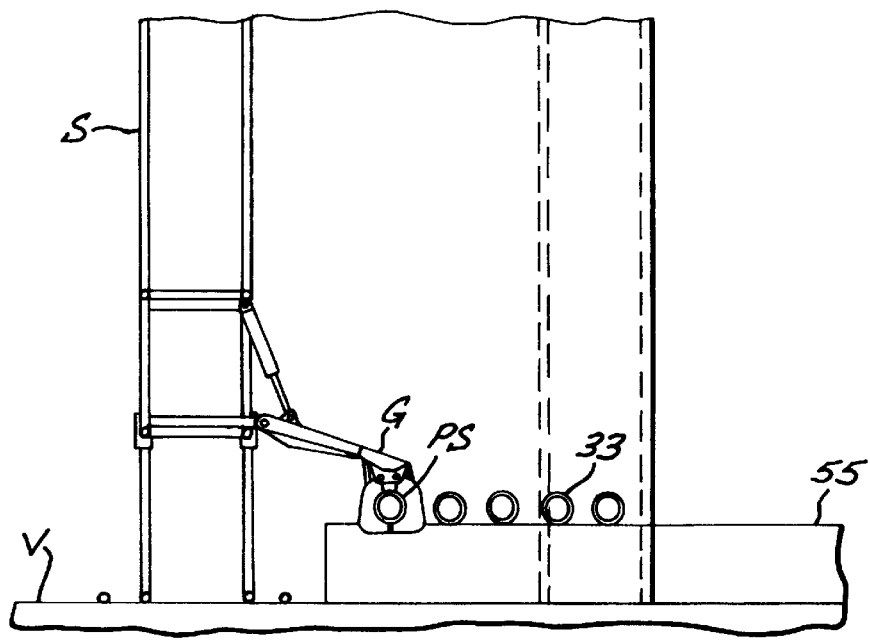
FIG. 4
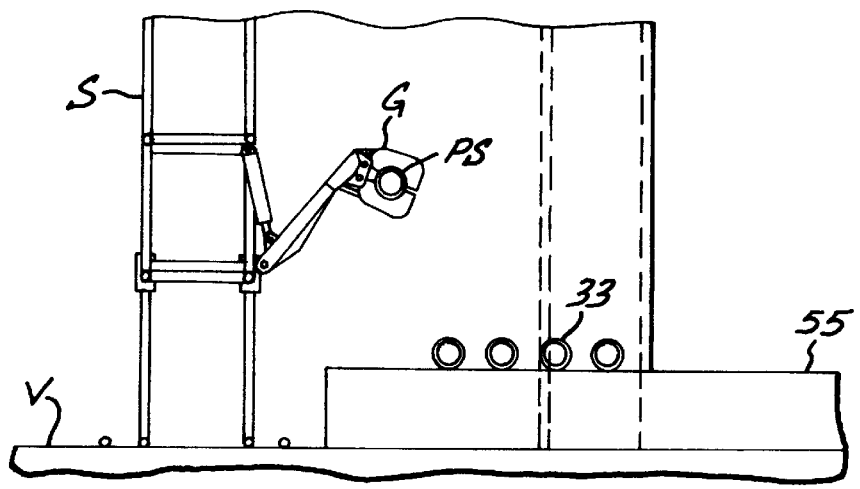
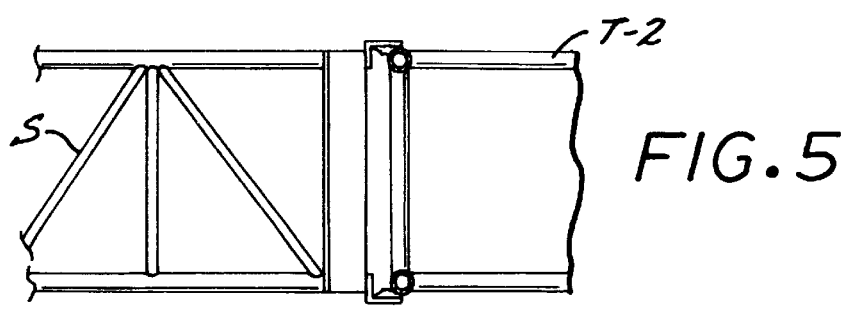
FIG. 5

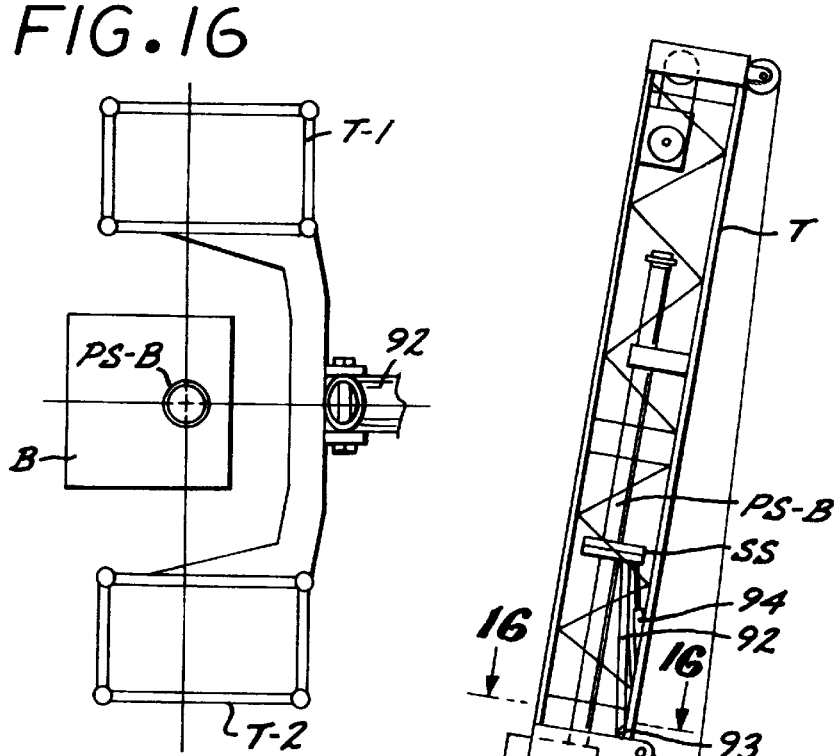
FIG. 16
FIG. 15
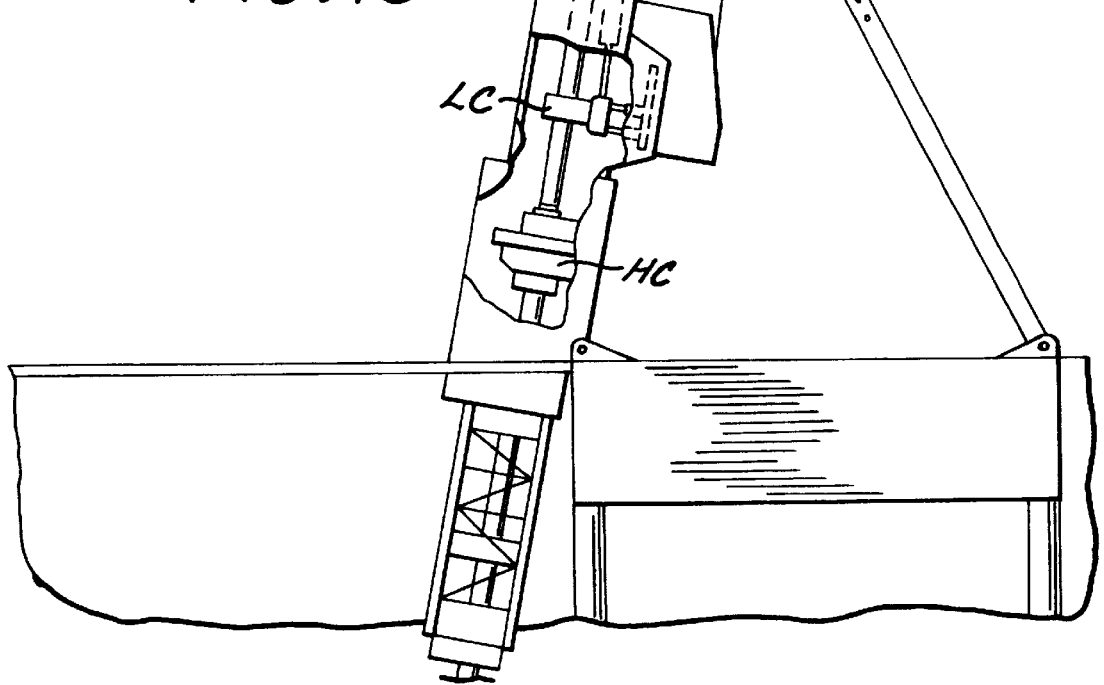

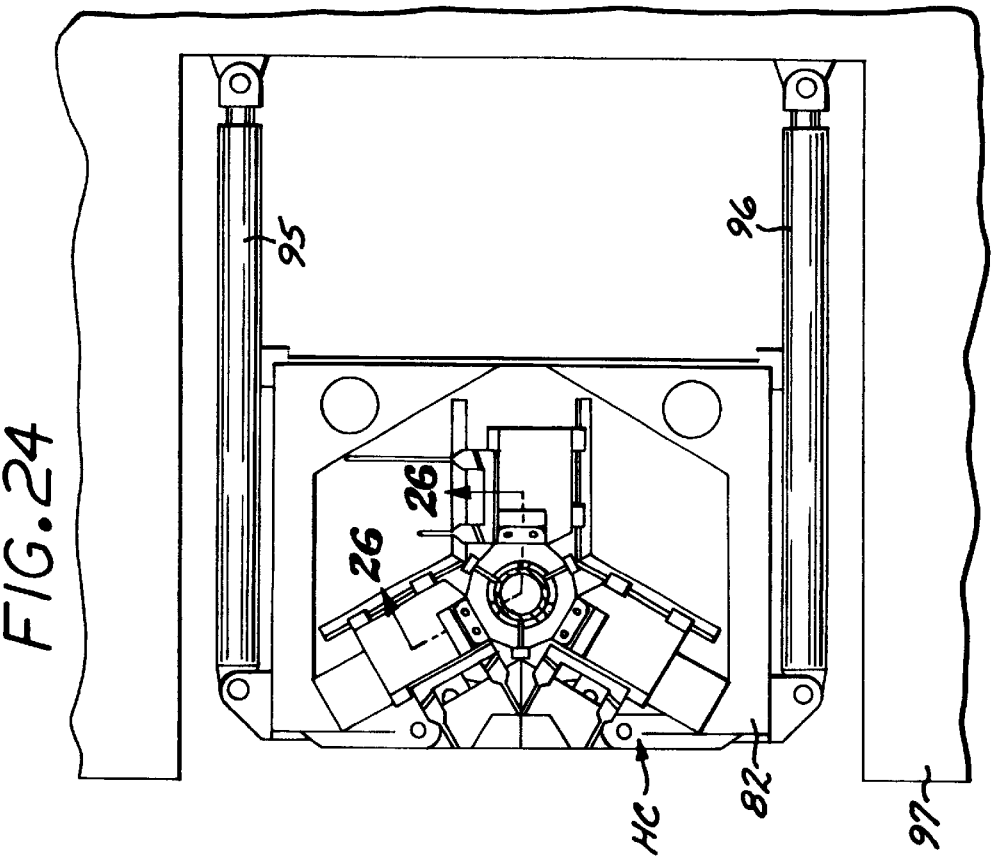
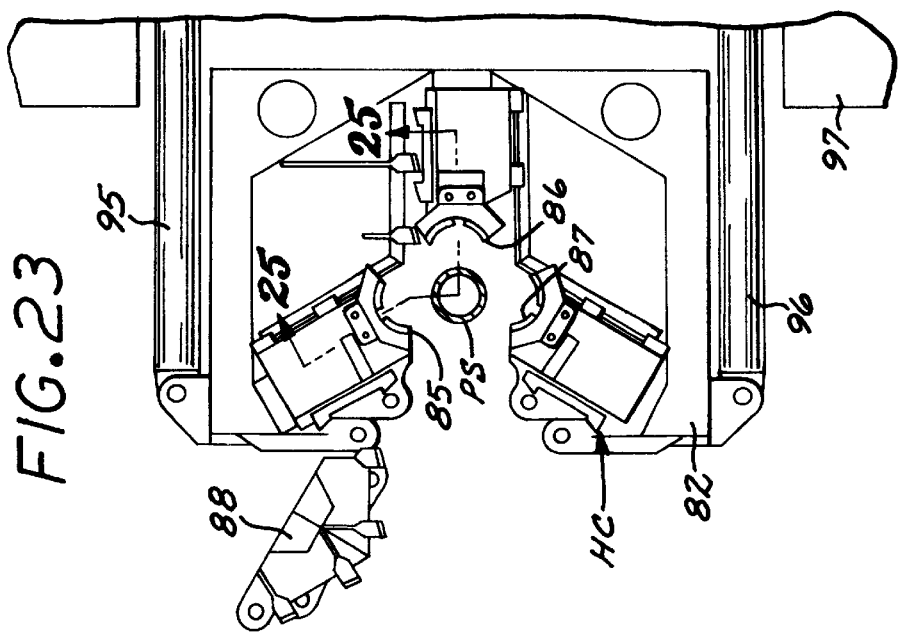

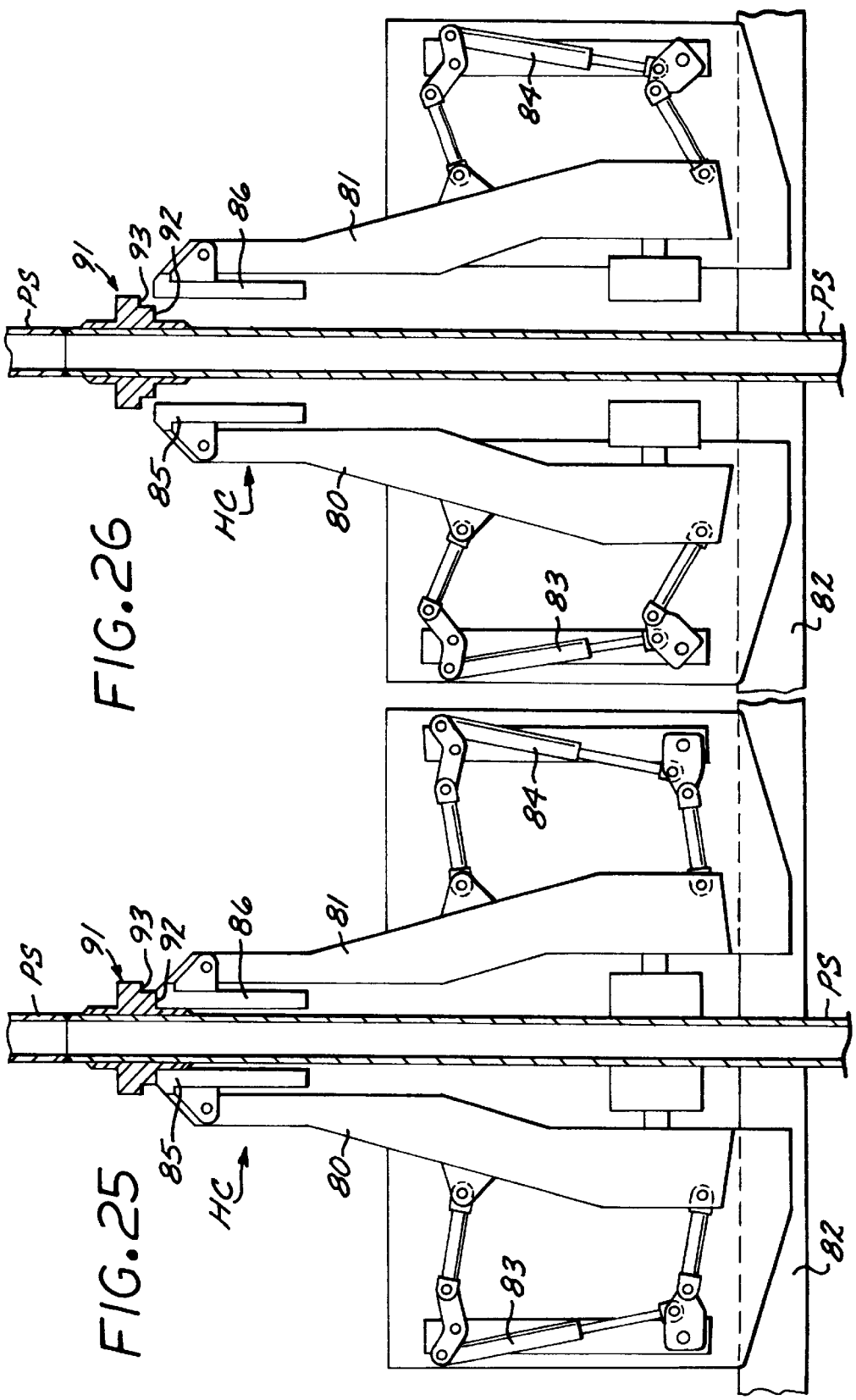

UNDERWATER PIPE LAYING METHOD AND APPARATUS

BACKGROUND OF THE INVENTION

1) Field of the Invention

The present invention is generally related to the underwater laying of pipelines and more particularly to the near vertical laying of pipeline offshore in deep water.

2) General Background

At the present time the offshore pipeline industry utilizes the concept of near vertical pipe laying (called J-Lay) as a system for deep water pipe laying. It has been heretofore proposed to conduct J-Lay pipe laying from a vessel having a tower pivotally mounted to the vessel so that it can be stowed horizontally and raised to a near vertical position during a pipe laying operation. A supply of pipe sections is stowed on the vessel's deck. Individual pipe sections are successively positioned within the tower by means of a loader termed a strongback. The strongback holds a pipe section to be introduced into the upper end of a pipeline while the lower end of such pipe section is welded to the upper end of the pipeline. The upper end of the pipeline extends through a fixed tower-mounted clamping mechanism located at the lower position of the tower. The tower includes a downward extension that houses pipeline guides and/or tensioners. After such welding is accomplished the pipeline and its newly-added pipe section is lowered through the clamping mechanism and the downward extension of the tower and the strongback is returned to the deck to pick-up a new pipe section. These steps are repeated as the vessel moves forward to thereby effect laying of the pipeline on the bottom of the sea. An example of this type of pipe laying system is shown in U.S. Pat. No. 5,421,675.

The aforedescribed underwater pipe laying systems may be helpful in laying pipe sections of uniform diameter. However, where large or bulky devices must be inserted into the pipeline, these systems do not permit expedient insertions of such items in the pipeline. Examples of such large or bulky devices are pipe valves, tee assemblies with their supporting structures and mud-mats, and pipeline termination assemblies. Pipe valves may have a diameter of 1.23 meters, a flange of 1.3 meters and a height of 1.62 meters from the center of the pipe lengths making up the pipeline, and tee assembly could be over 6 meters in width and 4.5 meters in height. Existing pipe lay systems in the tower do not allow convenient handling of such a bulky device, since it is not practical to design a fixed pipe clamping mechanism which will open up sufficiently wide as to permit downward passage of such devices. Also, where the pipeline extends through a plurality of tensioners it is necessary to successively open such tensioners to permit passage of such bulky devices thereby temporarily loosening tension applied to the pipeline.

SUMMARY OF THE INVENTION

The undersea pipe laying method and apparatus of the present invention permits bulky devices to be inserted into the pipeline without requiring a temporary pipeline support and the auxiliary equipment necessitated by the use of such temporary support. The additional time and effort required by the use of such temporary support and auxiliary equipment is eliminated by the present invention thereby effecting considerable cost savings.

More particularly, a preferred embodiment of the method and apparatus of the present invention is utilized with a pipe-laying vessel having a tower and a pivotable strongback which loads pipe into the tower for addition to the upper end of a pipeline which extends into the sea. The upper end of such pipeline is supported by a hang-off clamp or clamp arranged at the floor of the tower below a welding station. A downward extension of the tower houses a pipeline guide and/or a pipeline tensioner. The hang-off clamp may be of the mechanical form locking, friction holding or track tensioner type. Such hang-off clamp is opened to permit downward movement of the pipeline after a new pipe section has been attached by welding to the upper end of such pipeline. The tower is provided with means for supporting and lowering the new pipe section and guide means for aligning the new pipe section with the upper end of the pipeline for attachment to the upper end of the pipeline at the welding station. When it becomes necessary to insert a bulky device, such as a pipe valve or the like into the pipeline, a pipe section containing such device is welded to the upper end of the pipeline while the pipeline is supported by the tower-mounted hang-off clamp. Next, the hang-off clamp and guide means move the pipe section and attached pipeline away from their original position in the tower aligned with the downward extension of the tower to a second position located forwardly and clear of the downward extension. The new pipe section and attached pipeline are then lowered by a hoisting device until the bulky device is disposed below the downward extension. Thereafter, the hoisting device returns the hang-off clamp to its original position on the floor of the tower and another pipe section can then be welded to the upper end of the now-submerged bulky device-containing pipe section.

A second preferred embodiment of the method and apparatus of the present invention differs from the first embodiment in that after a pipe section containing the bulky device has been welded to the upper end of the pipeline a hoisting device moves such pipe section out of the hang-off clamp from the original position to its second position. The hoisting device then lowers the pipe section to the predetermined depth clear of the downward extension of the tower and thereafter returns the upper end of the pipe section to the hang-off clamp so that another pipe section can be added to the upper end of the now-submerged bulky device-containing pipe section.

The method and apparatus of the present invention also permits a pipe section to be added to a pipeline more rapidly than the heretofore utilized pipe laying systems, such as shown in U.S. Pat. No. 5,421,675 since it eliminates the necessity that the strongback support a pipe section while the latter is welded to the pipeline.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIGS. 3 and 4 are a vertical sectional views taken in enlarged scale along lines 3—3 of FIG. 2.

FIG. 5 is a horizontal sectional view taken in enlarged scale along line 5—5 of FIG. 2.

FIG. 7A is a sectional view taken in enlarged scale along line 7A—7A of FIG. 7.

FIGS. 13, 14 and 15–20 show a pipe section having a bulky valve assembly being added to the upper end of a pipeline by the method and apparatus of the present invention.

FIG. 23 is a sectional views taken in enlarged scale along line 23–23 of FIG. 17.

FIG. 24 is a sectional view taken in enlarged scale along line 24—24 of FIG. 20.

FIG. 25 is a vertical sectional view taken in enlarged scale along line 25—25 of FIG. 23.

FIG. 26 is a vertical sectional view taken in enlarged scale along line 26—26 of FIG. 24.

DETAILED DESCRIPTION OF A PREFERRED EMBODIMENT

Figure 1:
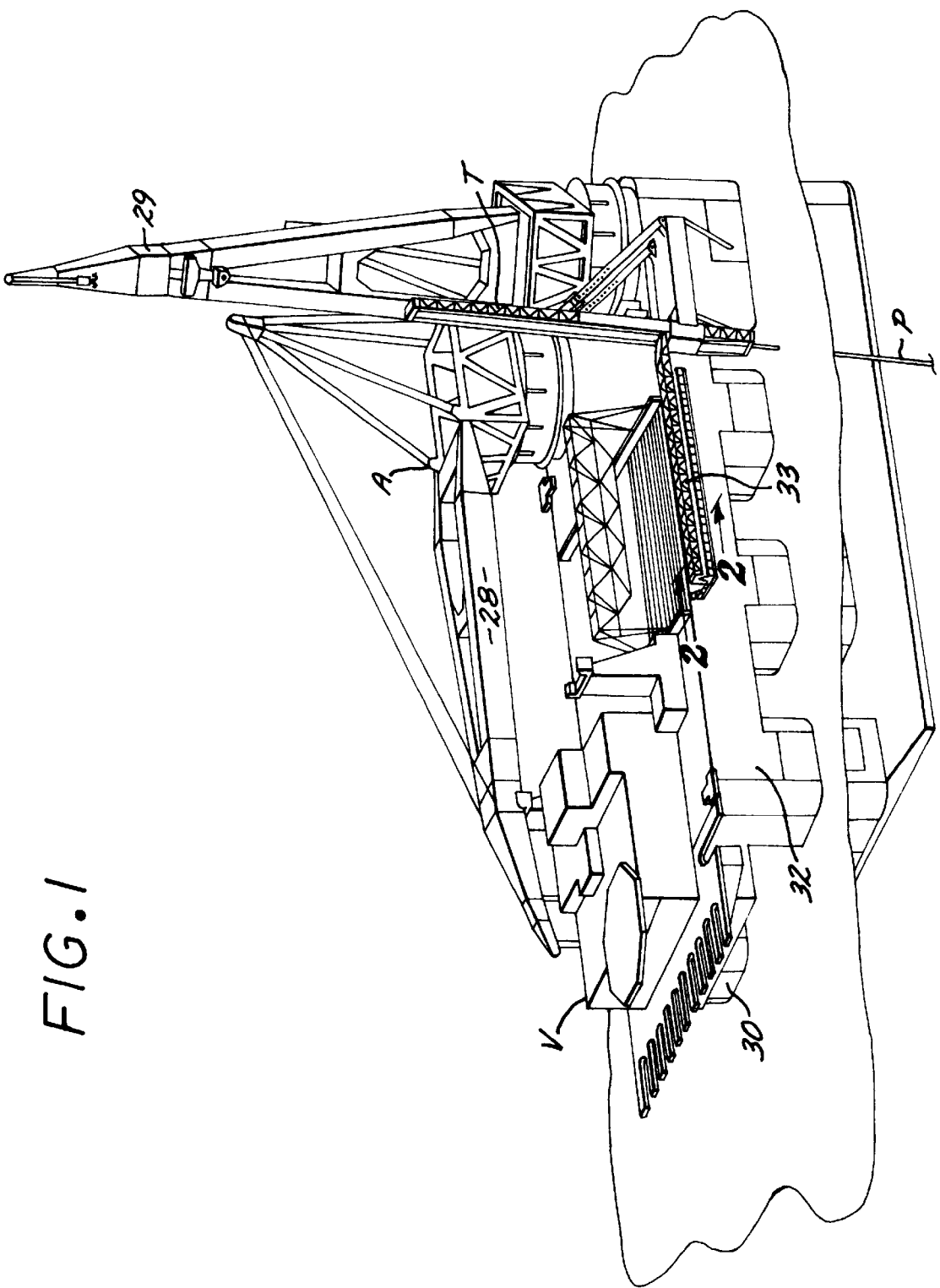
FIG. 1 is a perspective view of a vessel provided with apparatus for the underwater laying of a pipeline embodying the present invention.
Figure 2:
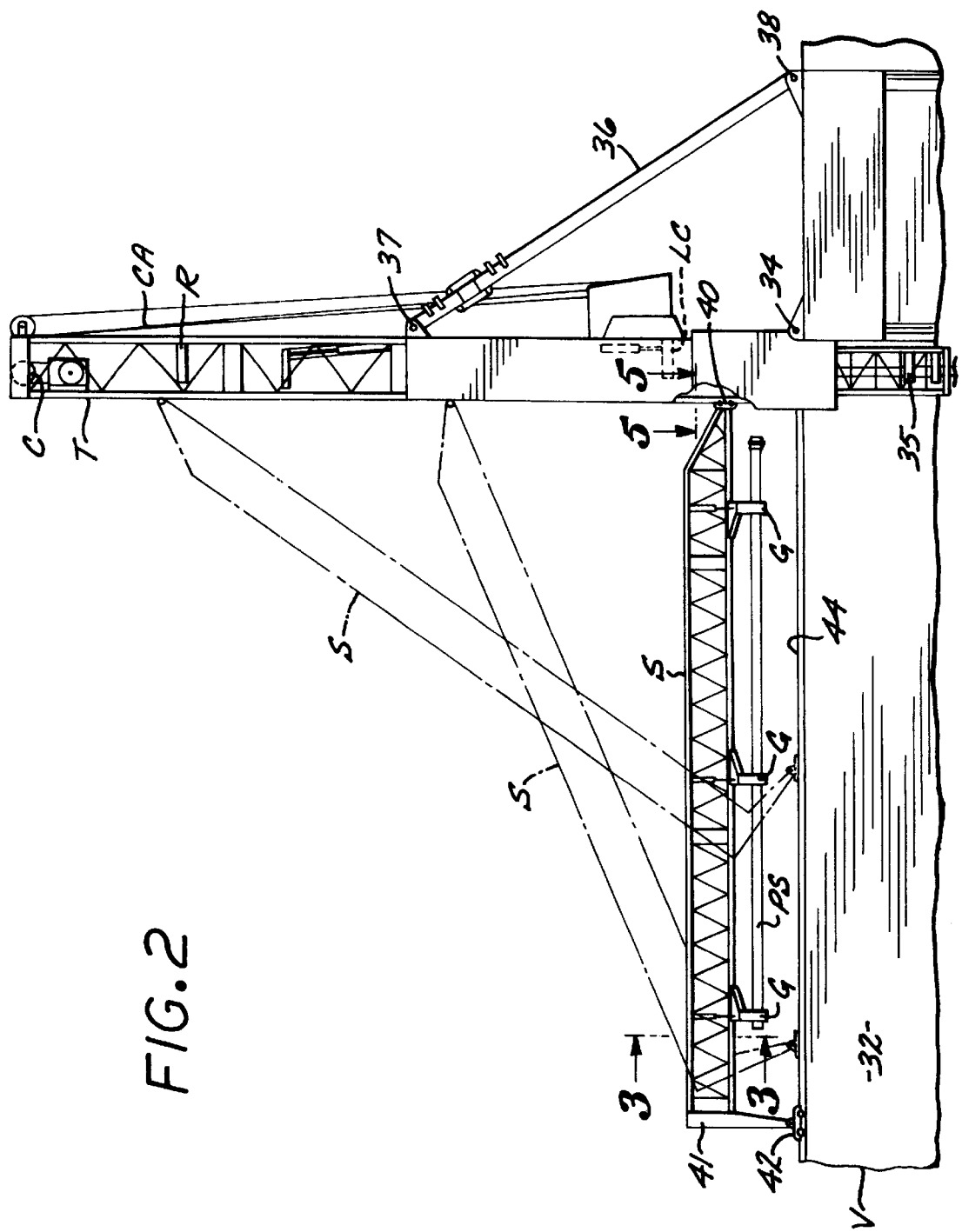
FIG. 2 is an enlarged broken side elevational view of such apparatus.

Referring to the drawings, a pipe laying vessel V, shown in FIG. 1, is provided with a first preferred form of apparatus A for the underwater laying of a pipeline P on a seabed (not shown). Vessel V is of the semi-submersible type, however, other types of vessels may be utilized for operation with pipe laying apparatus of the present invention. Vessel V is provided with two large rotatable cranes 28 and 29 of conventional construction mounted at the rear end portions of the semi-submersible hulls 30 and 32. Vessel V carries a supply of pipe sections 33 on its deck to be added to pipeline P. With further reference to FIG. 1 and also to FIG. 2, the pipe laying apparatus A includes a J-Lay tower T pivotally connected at 34 to vessel V for tilting in a vertical plane by hydraulic cylinders in a conventional manner, with the angle of such tower being defined by adjustable struts 36 having their upper end pivotally attached to the intermediate portion of the tower at 37 and its lower end pivotally attached to the vessel at 38. The tower T may be stowed in a lowered position (not shown) during rough seas or during travel of the vessel V. A pipe section lifting device, termed hereinafter a strongback S has one end slidably connected to the lower portion of the tower by rollers at 40. Such strongback extends longitudinally forwardly away from the tower at the start of a pipe laying operation with its front end supported by a depending leg 41. The lower end of leg 41 is provided with rollers 42 for movement along vessel deck 44. The strongback S is provided with a plurality of grippers G depending from one side of the strongback. Such grippers G serve to pick up a pipe section PS from supply 33 and lift such pipe section PS into a position adjacent tower T, as indicated in phantom outline in FIG. 2. When the strongback is raised along the front of tower T pipe section PS is added to the upper end of the pipeline P in a manner described hereinafter. A downward extension 35 of tower T houses conventional pipeline guiding means and/or pipeline tensioner means (not shown).

Figure 6:
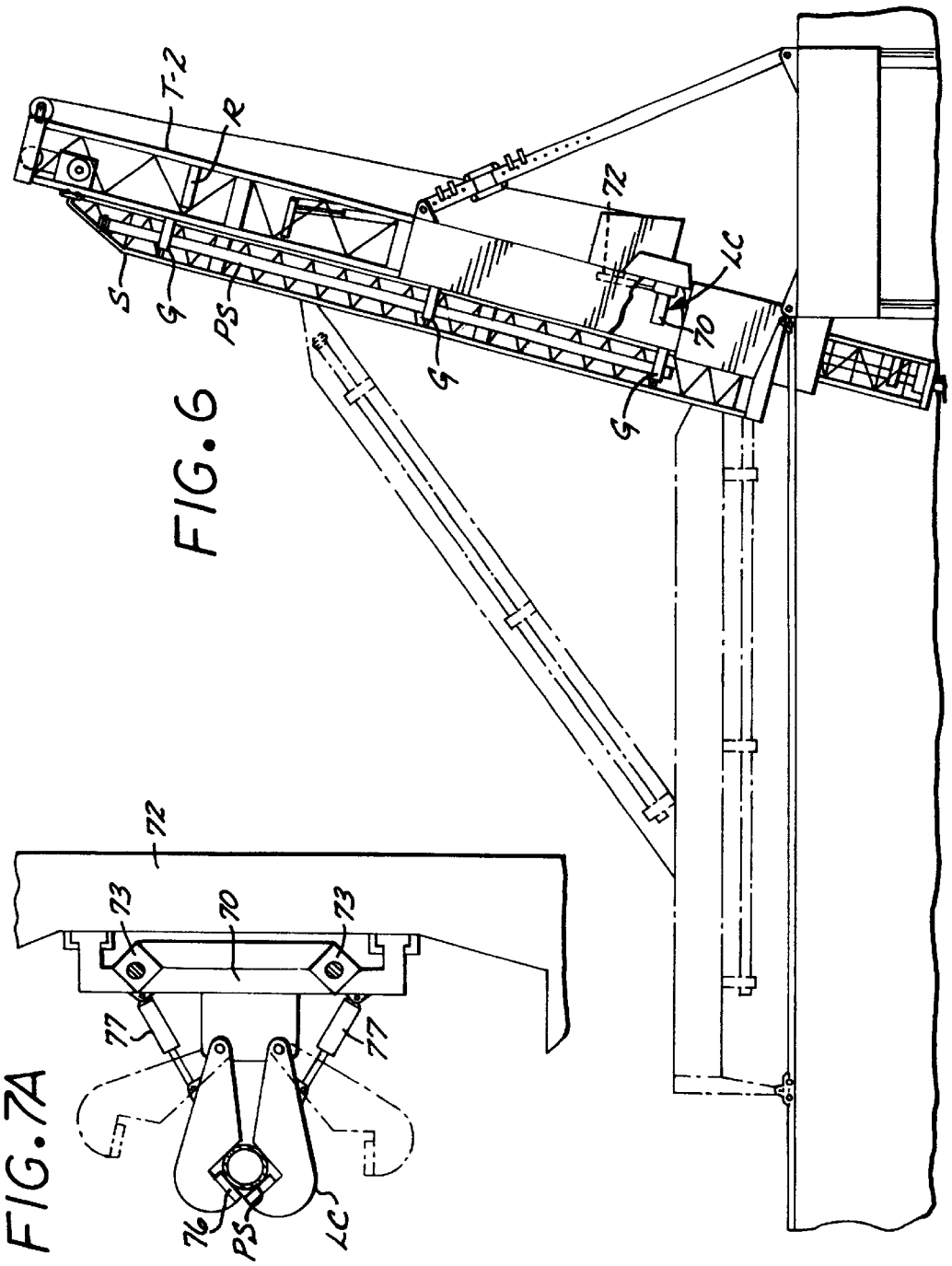
FIGS. 6–10 are broken side elevational views similar to FIG. 2 showing the operation of the apparatus embodying the present invention.
Figure 7:
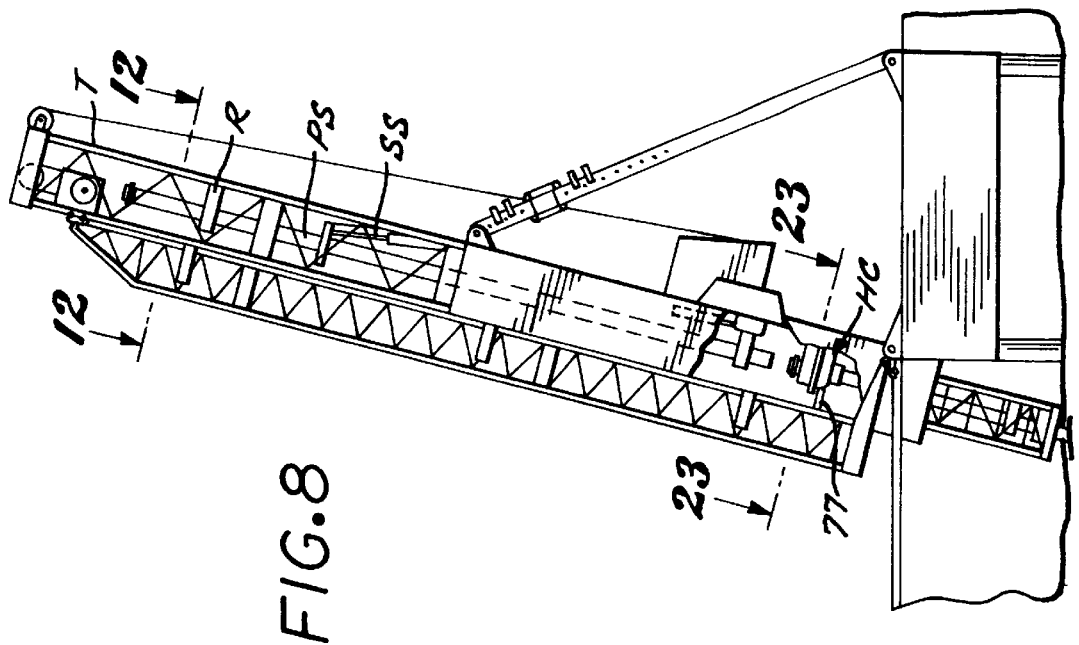
Figure 8:
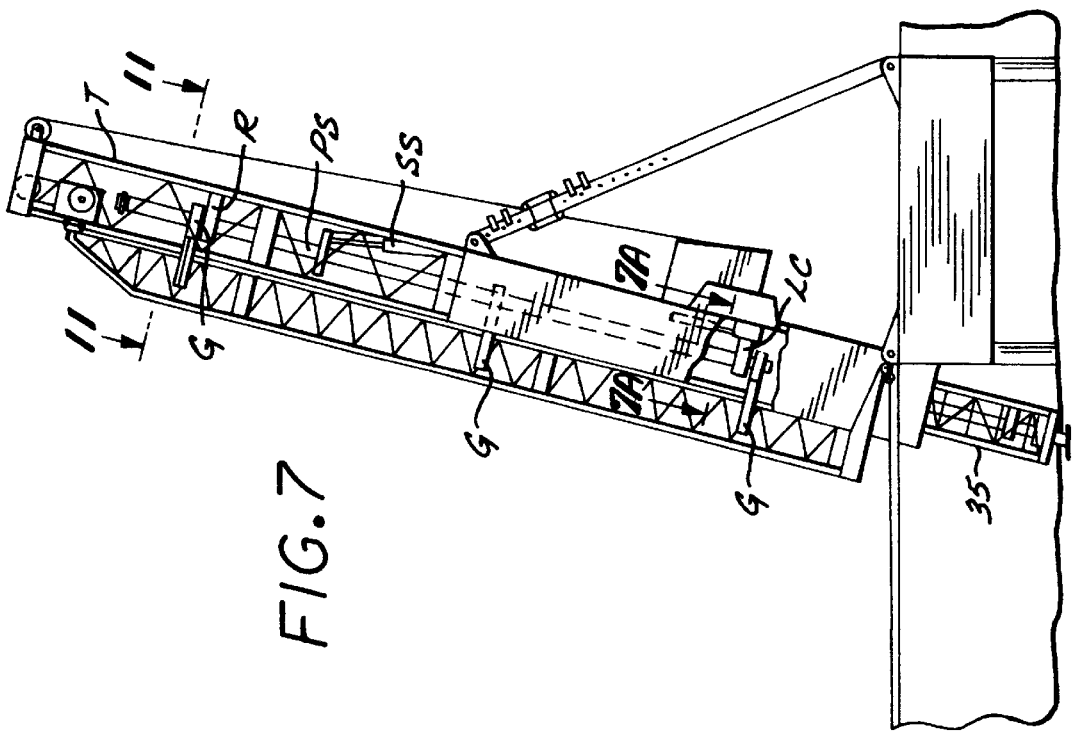
Figure 12:
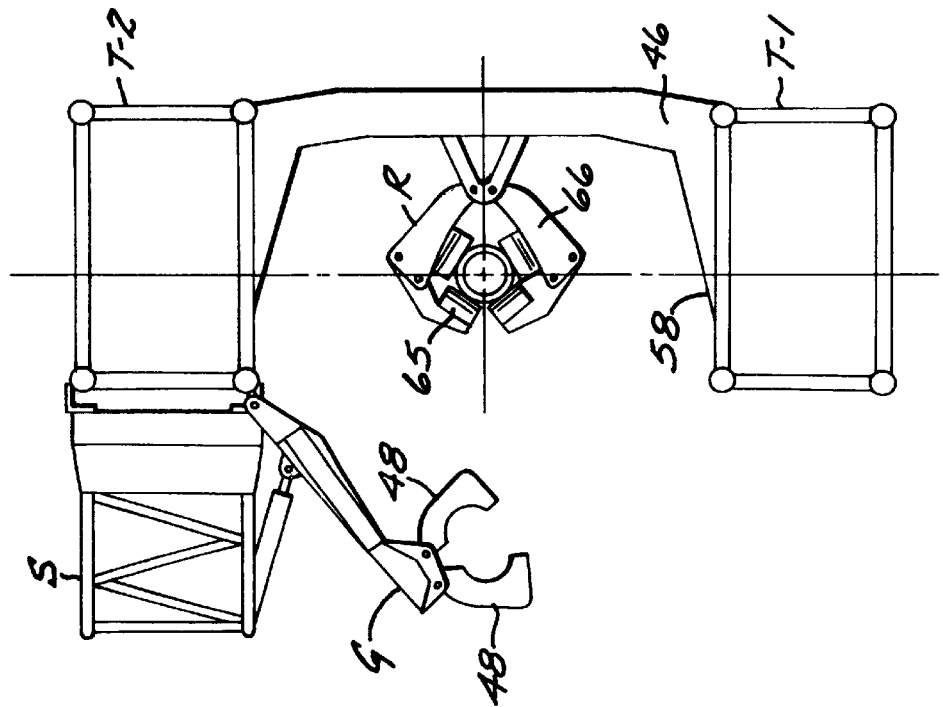
FIG. 12 is a sectional view taken in enlarged scale along line 12—12 of FIG. 8.
Figure 11:
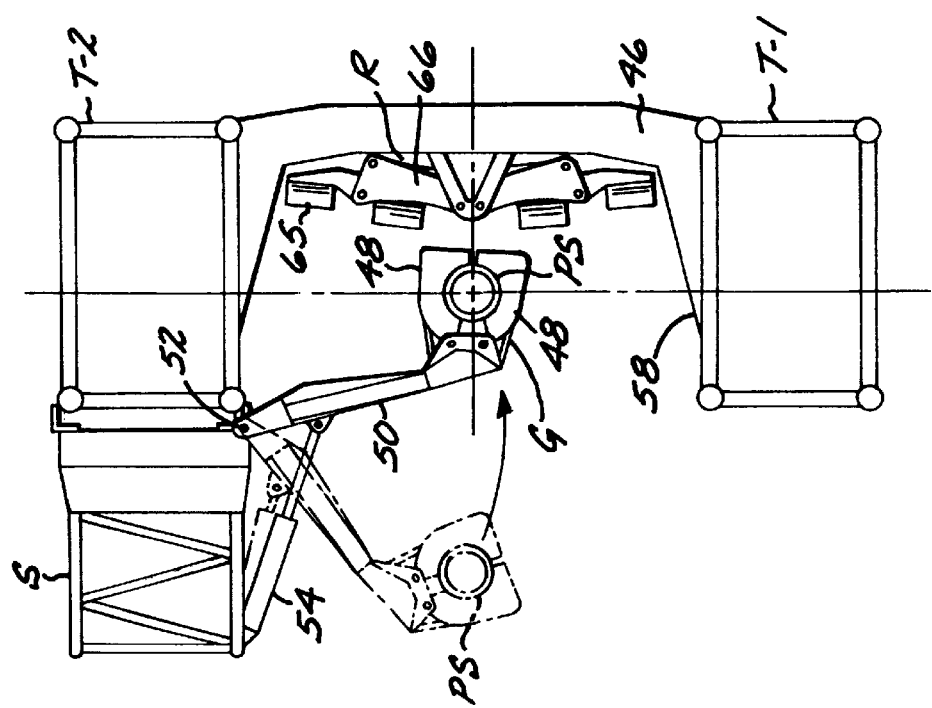
FIG. 11 is a sectional view taken in enlarged scale along line 11—11 of FIG. 7.

More particularly, tower T is defined by a pair of columns T-1 and T-2 which are laterally spaced relative to the longitudinal axis of the tower T and rigidly connected by girders 46 (See FIGS. 11 and 12). Such girders support various pipe handling equipment. Conventional hoisting means such as a crown block C and associated tackle CA is carried by the tower. Referring to FIGS. 11 and 12, the strongback grippers G are of like construction and include a pair of jaws 48 each mounted at the free end of an arm 50, with the opposite end of such arm being pivotally affixed to one side of the strongback at 52. A hydraulic or air-actuated cylinder and plunger unit 54 is interposed between the strongback and the arm 52 to effect swinging movement of such arm relative to the strongback in a plane normal to the longitudinal axis of the strongback. FIGS. 3 and 4 show the grippers G engaging pipe section PS so as to lift such pipe section from platform 55 upon which are disposed the supply 33 of similar pipe sections. In FIG. 6 the strongback S 33 is shown in phantom outline lifting pipe section PS from the position shown in FIGS. 2 and 3 to a raised position parallel to and adjacent the front of column tower T-2. From this position the grippers G will swing such pipe section into the opening 58 between the tower columns T-1 and T-2 in alignment with the upper end of pipeline P, as shown in FIG. 11. In this position of pipe section PS it will be encircled by a plurality of tower guide rollers assemblies R which include four roller elements 65 carried by articulated arms 66 movable by conventional hydraulic or air-operated cylinder and plunger units (not shown) between an open position of FIG. 11 and the closed position of FIG. 12 wherein such tower rollers 64 serve to guide the pipe section PS for vertical movement in alignment with a line-up clamp LC. Line-up clamp LC includes a body 70 which is vertically slidably carried by a girder 72 of the tower by means of a pair of vertically extending hydraulic or air-operated cylinder and plunger units 73. As shown in FIG. 7A, body 70 is provided with conventional pipe gripping slips 76 selectively engageable with the pipe section PS to support the lower portion of such pipe section in the tower after the strongback grippers G have handed off such pipe section to the line-up clamp LC, with such clamp supporting the pipe section for lateral, vertical, and rotational movement to position such pipe section just above and in alignment with a hang-off clamp or clamp HC located above a floor 77 disposed in the lower portion of the tower (FIG. 8).

Referring to FIGS. 8, and 23–26 hang-off clamp HC includes three, like opposed, vertically extending arms 80 and 81 carried by frame 82 movable towards and away from pipe section PS by means of hydraulic cylinder and plunger units 83 and 84 and associated linkage between their positions of FIGS. 25 and 26. The upper ends of the arms are provided with three, like pads 85, 86 and 87 pivotally carried by the upper ends of the arms. Pads 85, 86 and 87 move horizontally towards and away from a collar 91 (which can also serve as buckle a arrester) that is affixed to the upper end of pipe section PS. Collar 91 is formed with a pad-receiving shoulder 92 above which is formed an elevator-receiving shoulder 93. When the collar shoulder 92 is engaged by the upper ends of the pads, the hang-off clamp HC serves to clamp and thereby firmly support the pipe section PS and the pipeline P attached to the bottom thereof within tower T. When the jaws are retracted to displace the pads from the collar surface 92 the pipe section PS and pipeline P is free to undergo vertical movement relative to the tower. It should be noted that other pipe clamping elements, such as conventional serrated pipe slips (not shown) may be utilized in place of the pads 85, 86 and 87 to support a pipe section and the pipe line attached thereto within the tower. Note a gate 88 is pivotally attached to the front of frame 82 for a purpose to be described hereinafter.

Figure 10:
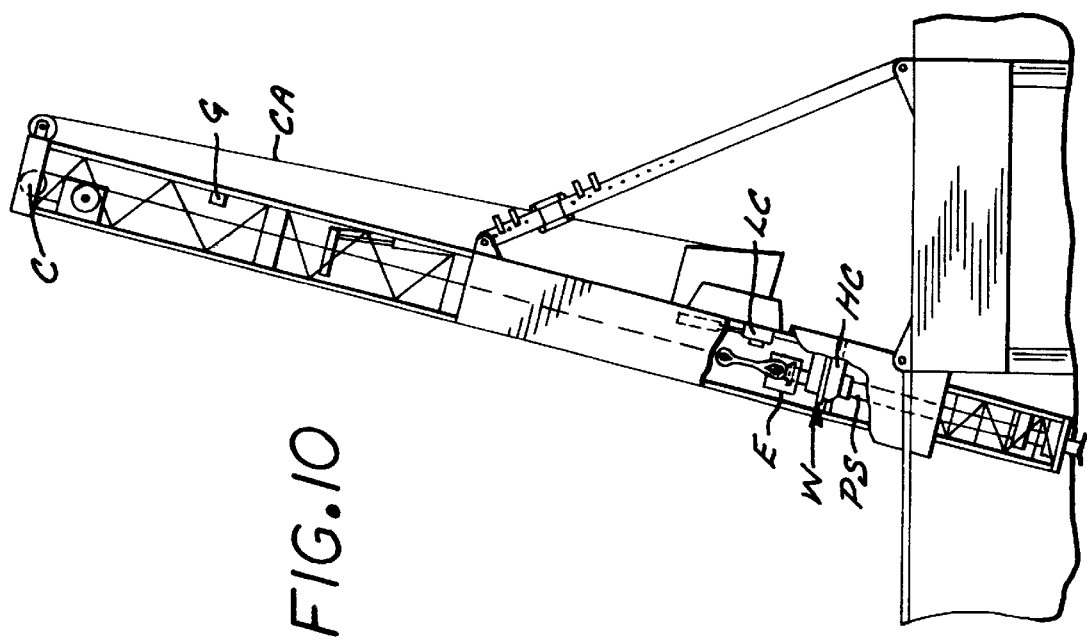
Figure 9:
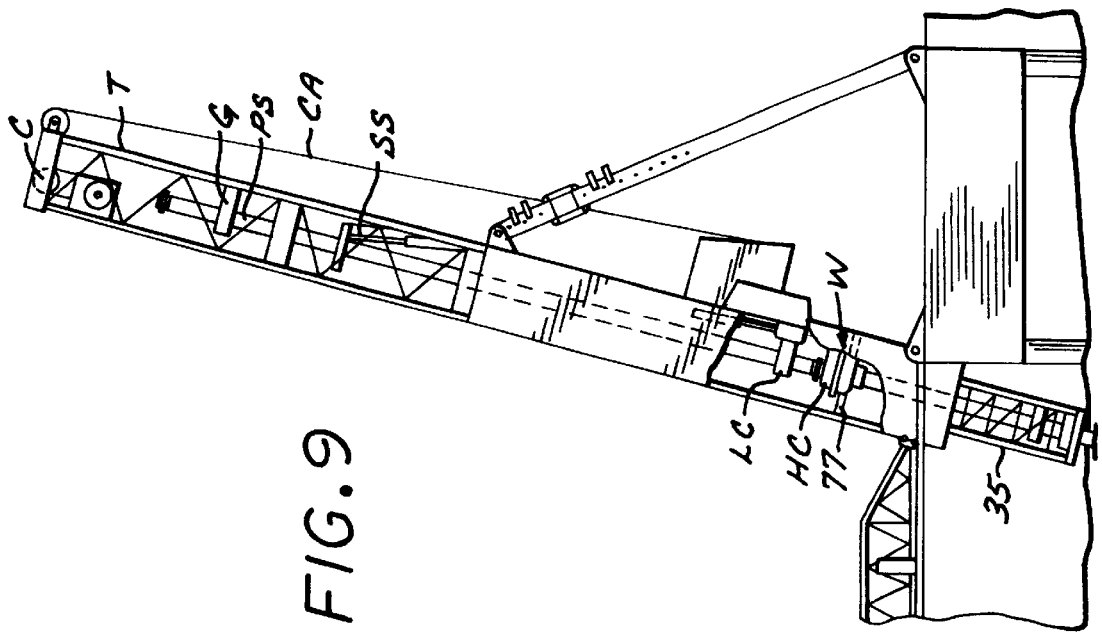

Referring now to FIGS. 6–9, once the pipe section PS has been handed off to the line-up clamp LC and guide roller assemblies R with the line-up clamp HC engaging and supporting the lower portion of the pipe section, the strongback S can immediately return to the pipe supply to pick-up another pipe section. The line-up clamp body 70 will then be moved downwardly by means of cylinder and plunger units 73 until the lower end of the pipe section is engaged with the upper end of the pipe section PS-2 forming the uppermost portion of pipeline P. Thereafter, the lower end of pipe section PS is welded to the upper end of pipe section PS-2 at the welding station W of the tower located just above floor 77, as indicated in FIG. 9. Referring now to FIG. 10, after the welding operation the crown block B lowers a conventional elevator E into engagement with the elevator-receiving shoulder 93 of collar 91 formed at the upper end of pipe section PS and the crown block and associated tackle CA is utilized to lower pipe section PS, the attached pipeline into the sea as the vessel V moves forwardly. The above-described method and apparatus provides a more rapid and efficient manner of adding a pipe section to a pipeline than heretofore proposed arrangements.

Figure 13:
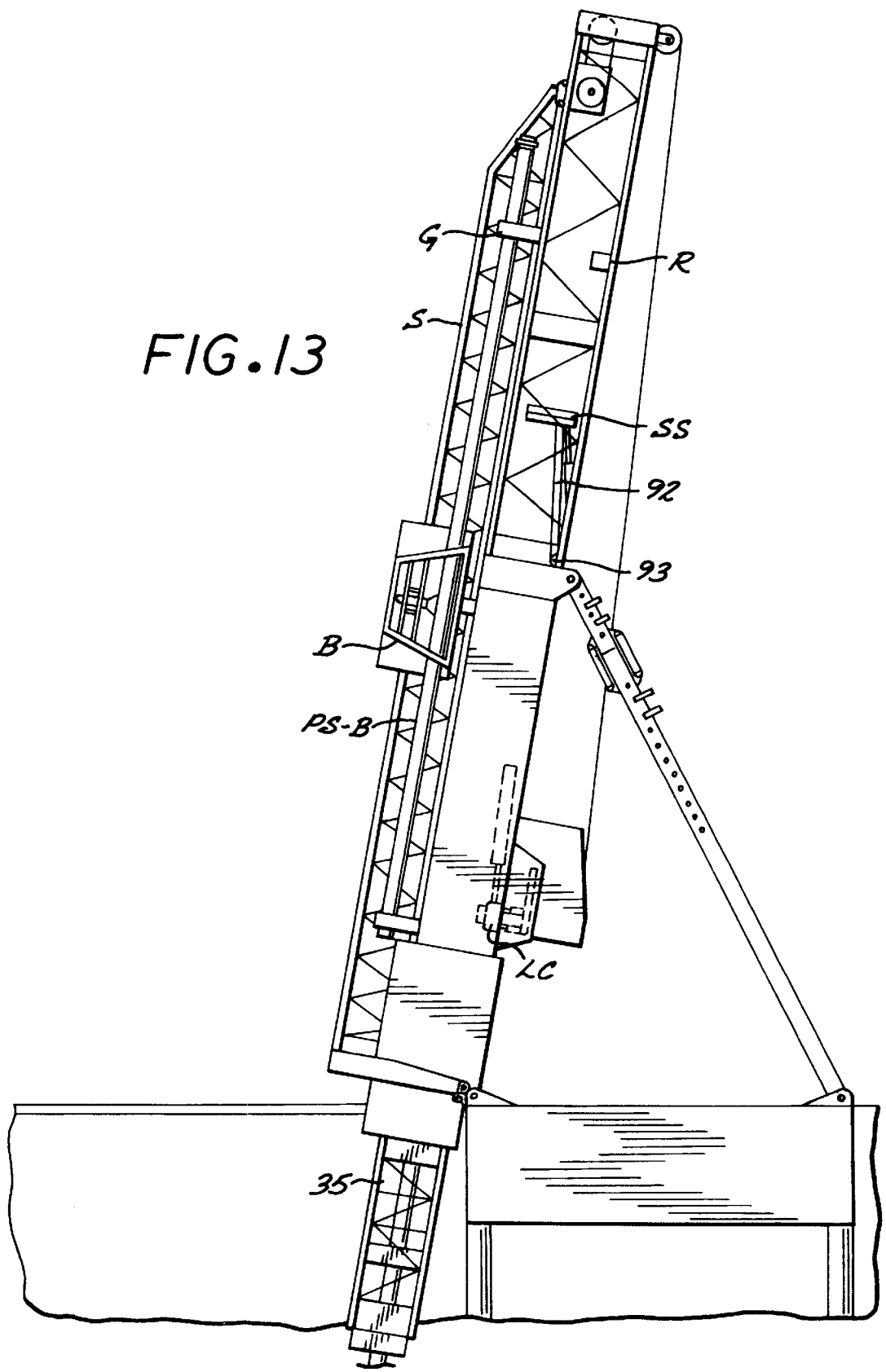

Referring now to FIGS. 13 through 26, there is shown the manner in which the aforedescribed method and apparatus may be utilized to insert a pipe section carrying a bulky device of a size larger than the diameter of the pipe sections into a pipeline. Such bulky device may take the form of a pipe valve, a tee assembly, a pipeline termination assembly or the like. In FIGS. 13 through 19 a bulky device such as a pipe valve assembly box B is shown secured by welding to the intermediate portion of a pipe section PS-B. In FIG. 13 the pipe section PS-B is shown being transferred from the vessel deck to a position adjacent the front of the tower T by the aforedescribed strongback S. Thus, referring to FIG. 17 and additionally to FIGS. 23 and 24, frame 82 of the hang-off clamp HC is moved between its original position within tower T by a pair of hydraulic or air-actuated cylinder and plunger units 95 and 96 interposed between the frame and a base 97 of the tower. In FIG. 24, the hang-off clamp is shown in its first, closed position of FIG. 25 with pads 85, 86 and 87 engaging the underside of pad-receiving shoulder 92 of collar 91. In FIG. 23, the hang-off clamp is shown after units 95 and 96 have extended such clamp outwardly from its original first position within the tower into its side-step second position of FIG. 17. The hang-off clamp HC moves forwardly parallel along a vertical plane extending through such clamp. Gate 88 is opened in order that pipe section PS-B can be withdrawn from clamp HC.

Figure 14:
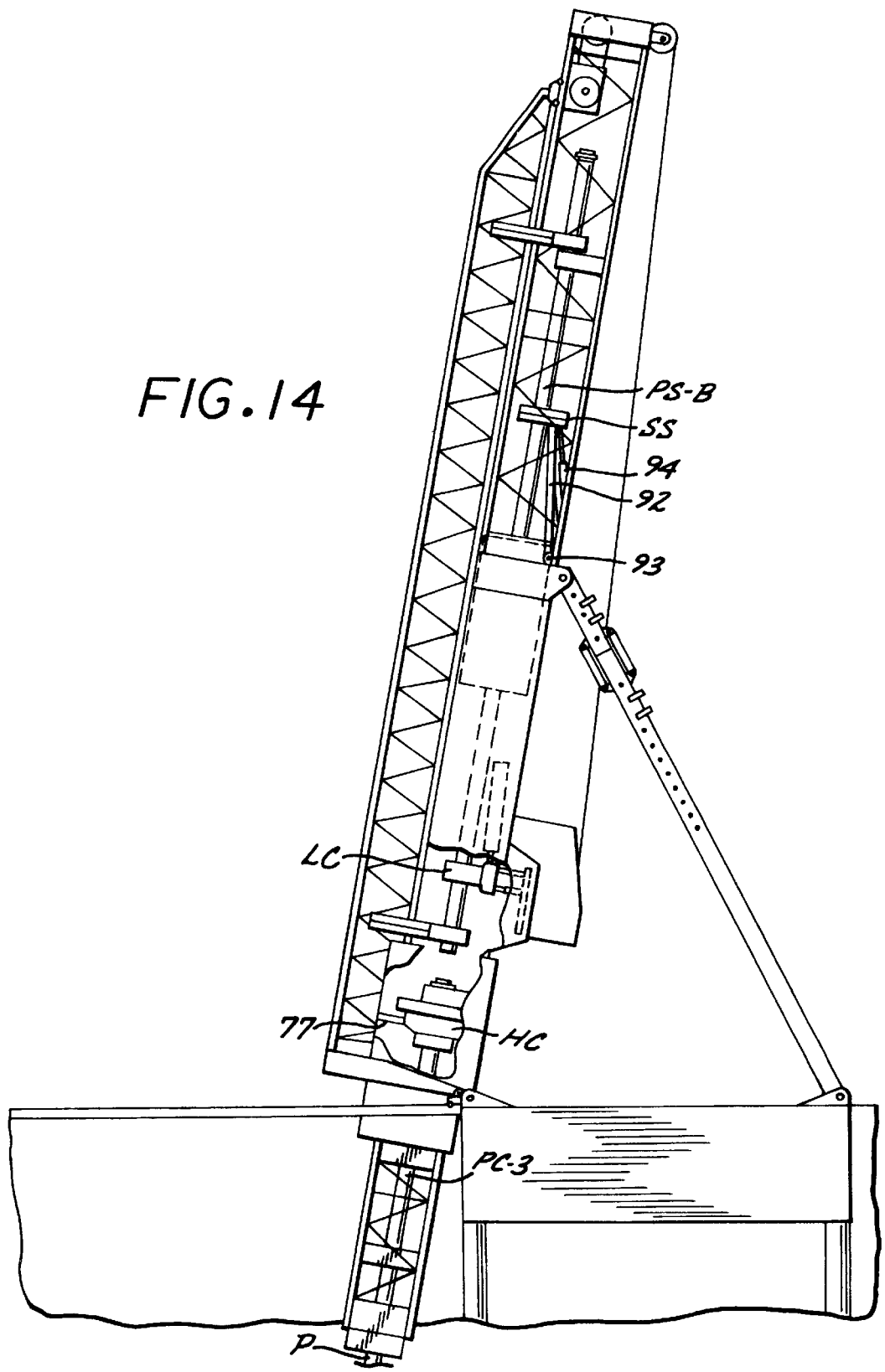
Figure 17:
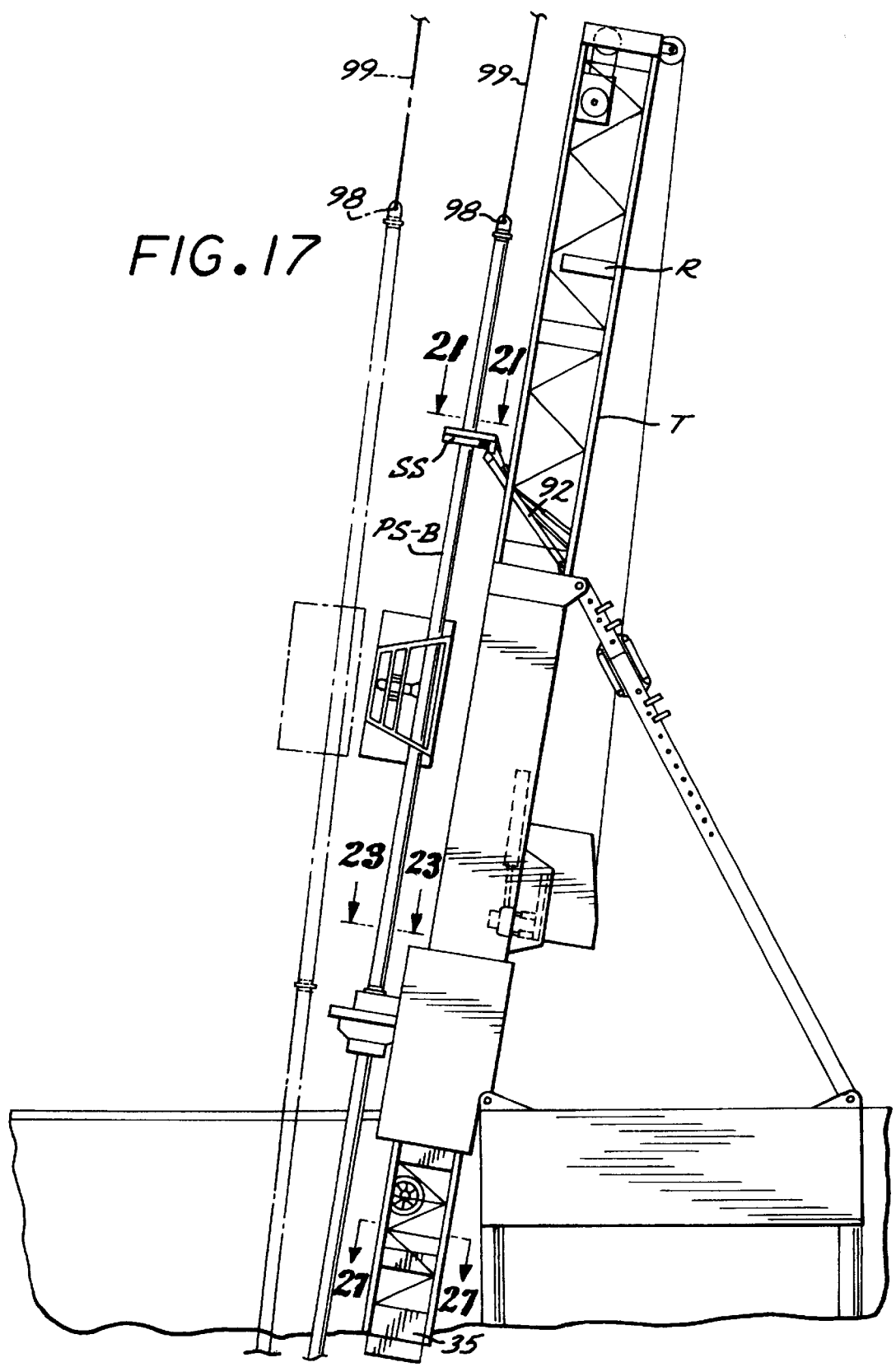
Figure 22:
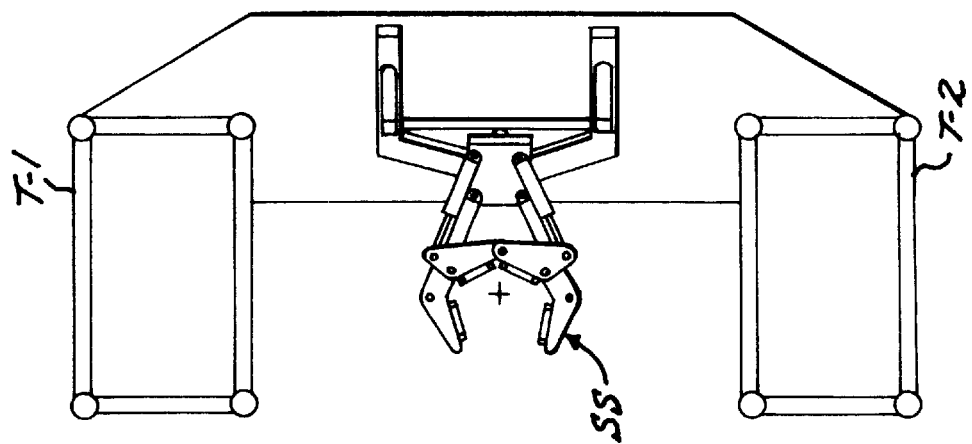
FIG. 22 is a sectional view taken in enlarged scale along line 22—22 of FIG. 18.
Figure 21:
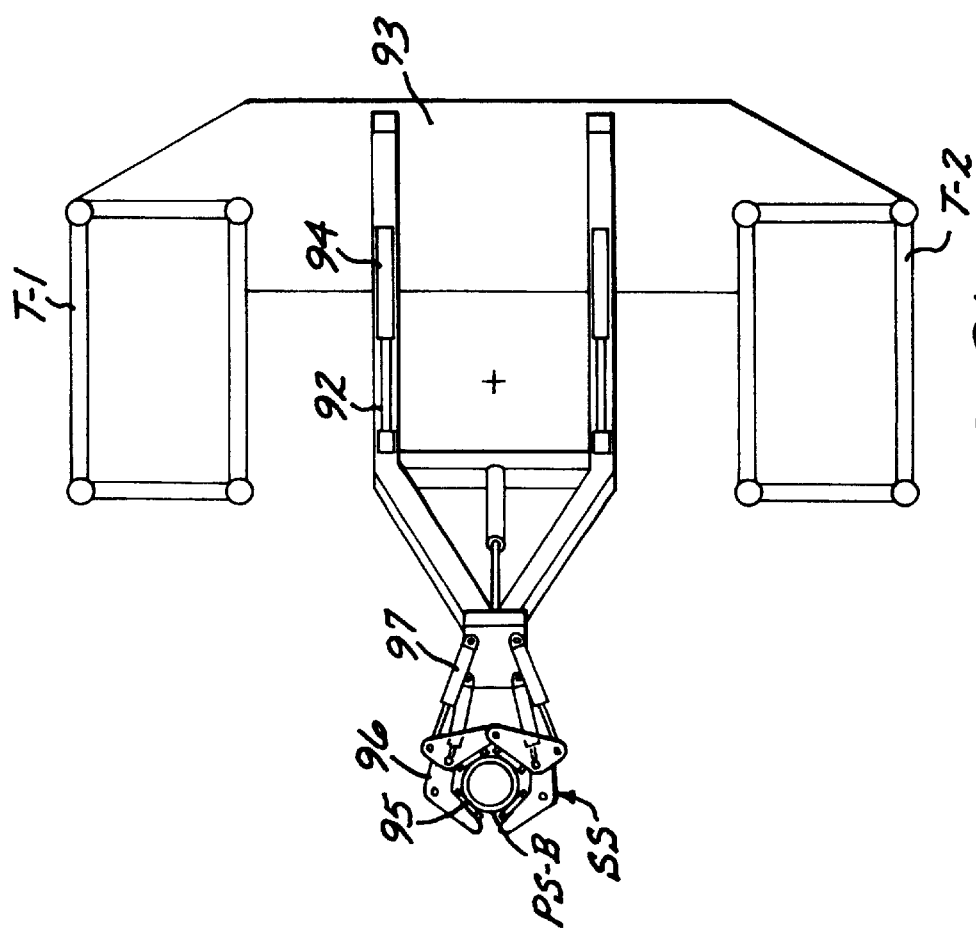
FIG. 21 is a sectional view taken in enlarged scale along line 21—21 of FIG. 17.

Referring now to FIGS. 14, 15 and 16, after the pipe section PS-B has been swung into the tower opening 58 by the grippers G, the upper intermediate portion of such pipe section will be engaged by a side-step guide SS. Guide SS is affixed to the free end of an inclined actuating arm 92 having its opposite end pivotally attached to the tower T at 93, as shown in FIGS. 21 and 22. Manipulation of the guide SS is provided by hydraulic or air-operated cylinder and piston units 94 interposed between arm 92 and a girder 93 of the tower T. At this time, the guide SS will guide pipe section PS-B by guide rollers 95 secured to a pair of opposed semi-circular brackets 96 that are opened and closed by cylinder and plunger units 97 and guide such pipe section into the aforedescribed line-up clamp LC. The clamp LC will lower the pipe section onto the upper end of pipe section PC-3 whereby the lower end of pipe section PS-B can be welded to the lower end of pipe section PC-3 at welding station W, as shown in FIG. 15. Prior to or during such welding operation, the upper end of pipe section PS-B will be releasably secured to conventional fitting 98 connected to a hoisting means that includes a cable 99 which extends upwardly to the pulley of a crane (not shown), the end of cable 99, as shown in FIG. 17. The pulley of such crane should preferably be positioned in alignment with the upper end of the pipeline disposed within the hang-off clamp HC. Thereafter, the tower guide roller assemblies R will be moved to their open position of FIG. 11. Hang-off clamp HC will be moved from its first original position to its second position. Movement of the hang-off clamp will be coordinated with movement of the side-step guide which will be urged outwardly in a forward direction from within the confines of the tower. The hoisting means will now take over the load of the pipeline from the hang-off clamp. Hang-off clamp gate 88 is opened. The side-step guide will also be opened (FIG. 22) and moved to its original retracted position in the tower. Pipe section PS-B and attached pipeline can now be moved by the hoisting means to a position spaced forwardly away from the hang-off clamp and the tower.

Figure 18:
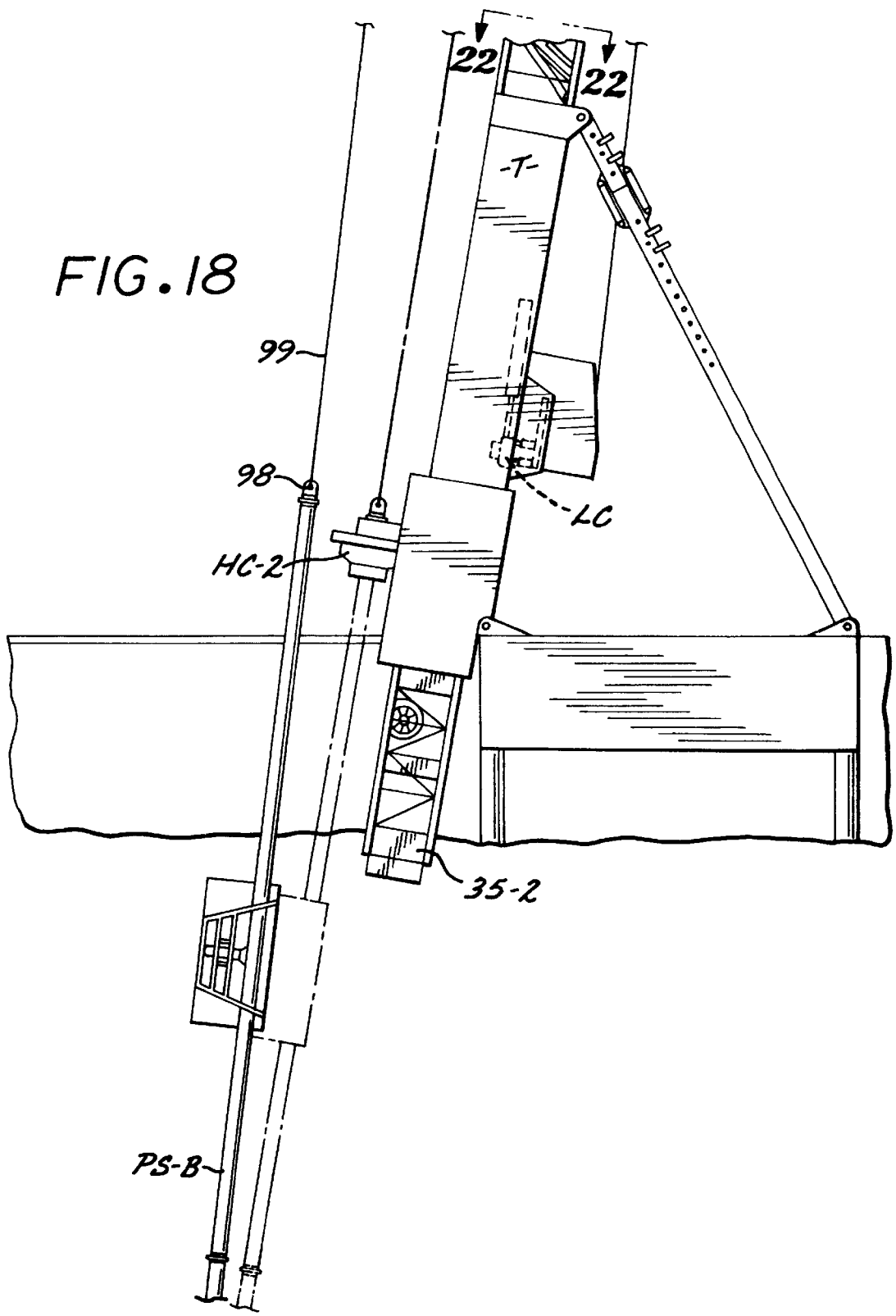
Figure 19:
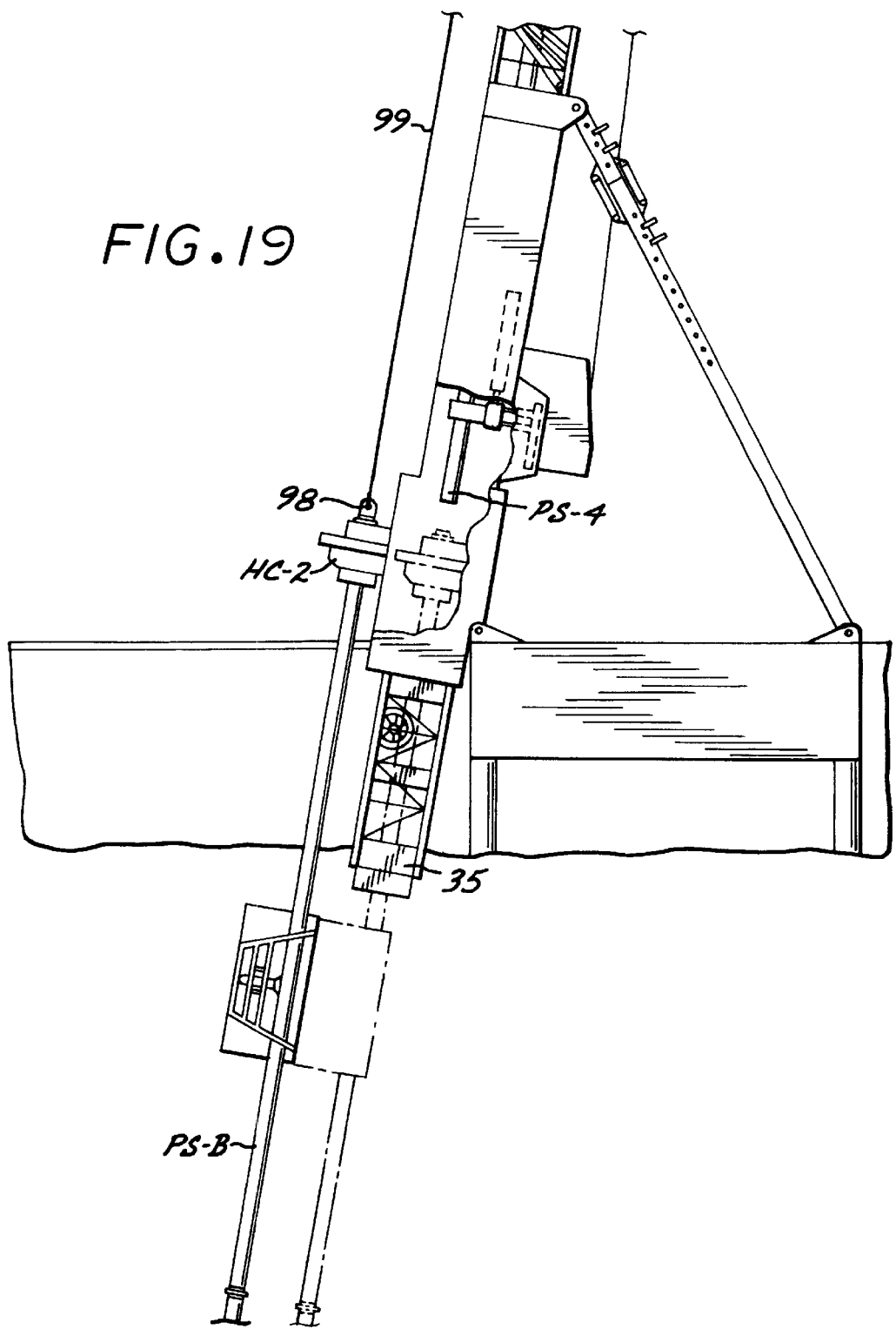
Figure 20:
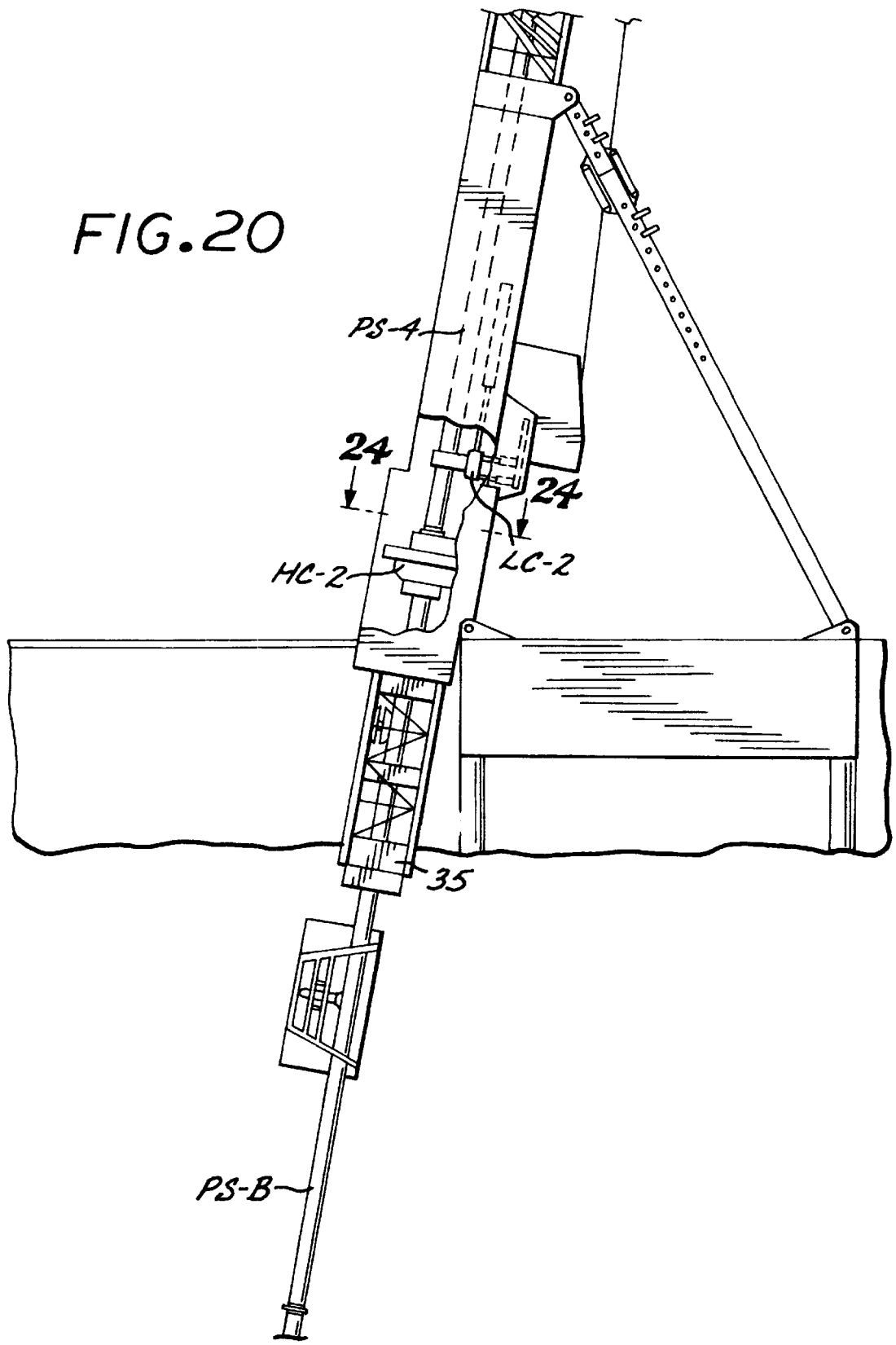

The hoisting means crane will unspool cable 99 to lower the pipe section PS-B into the sea until valve box B is submerged to a predetermined depth below the tower and clear of downward extension 35 of the tower, as shown in FIG. 17 and 18. Thereafter, the crane will swing the upper end of pipe section PS-B back into the tower opening 58 with the pipeline guide means and/or tensioner means being opened to receive the upper portion of such pipe section. Gate 88 will be closed and hang-off clamp HC will then be retracted to its original position in order that a new pipe section PS-4 may be added to the pipeline in the manner described hereinbefore (FIG. 19).

Referring to schematic drawings designated FIGS. 27–32, there is shown a second preferred form of apparatus AA embodying the present invention for underwater laying of a pipeline P on a seabed (not shown). The apparatus AA is carried by a pipe laying vessel VV similar to that shown and described hereinbefore. Vessel VV is provided with hoisting means such as a conventional rotatable crane CC of conventional construction having a pivotable arm 98 from the free end of which depends on installation cable 100 to the lower end of which is releasably attached a lowering cable 101. Cable 101 is carried by a pulley 102 located at the intermediate portion of arm 98. The free end of lowering cable 101 is provided with a conventional releasable fitting 103. A bulky device such as pipe valve assembly box BB is shown secured by welding to the intermediate portion of pipe section PS-B2. Pipe laying apparatus AA also includes a J-lay tower TT of conventional construction pivotally connected to the vessel VV for tilting in a vertical plane in the manner described hereinbefore with respect to tower T of FIGS. 1–26. A plurality of forwardly extending tower guide roller assemblies RR are longitudinally spaced along the front of tower TT. Such tower guide rollers may be similar in construction and operation as tower guide rollers assemblies R described hereinbefore. The lower portion of the tower may preferably be provided with a line-up clamp LC-2 having a construction like the aforedescribed line-up clamp LC. The tower T has a downward extension 35-2 that houses conventional pipeline guide means and/or pipeline tensioner means (not shown).

Figure 27:
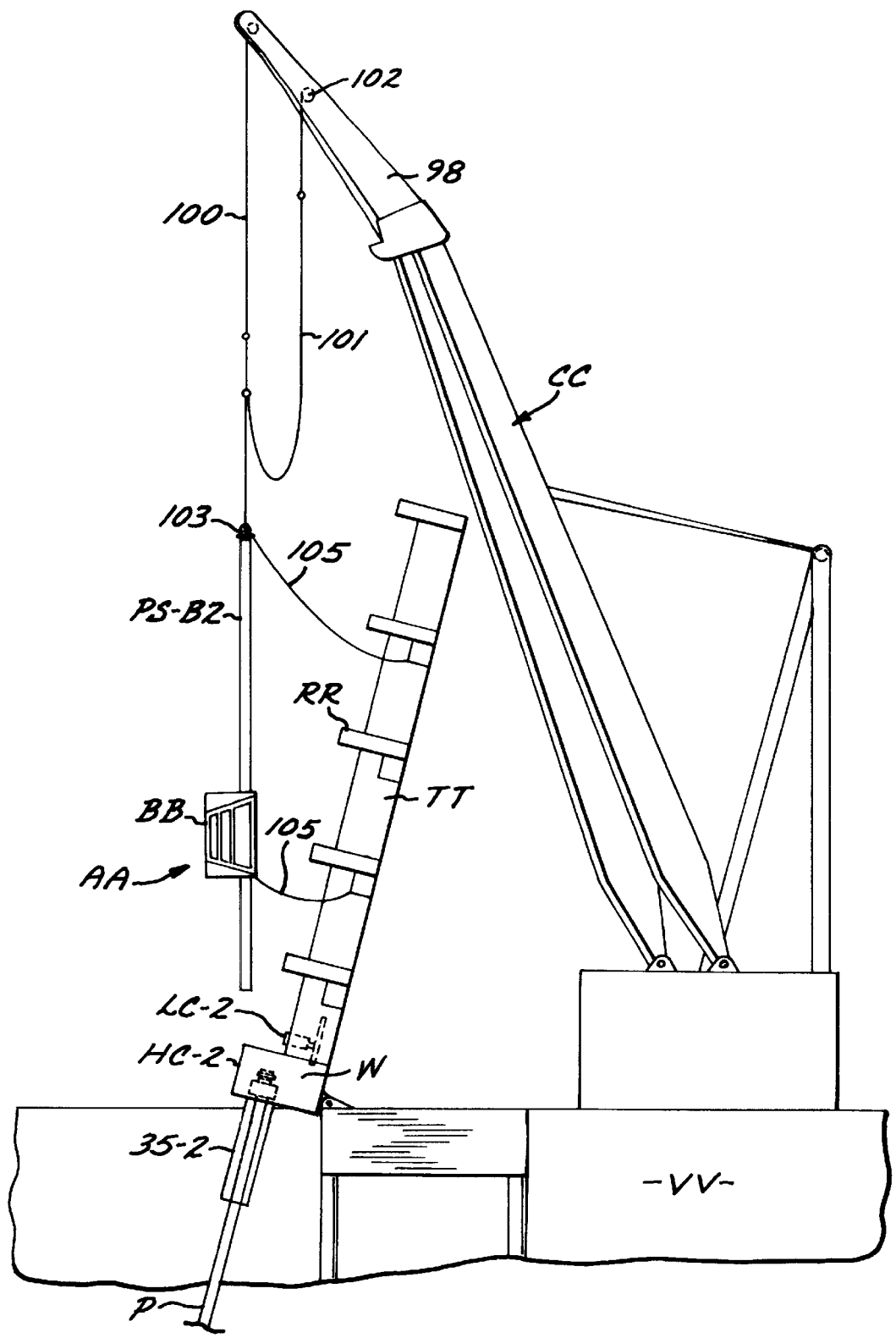
FIGS. 27–31 are schematic side elevational views showing the operation of a second form of apparatus embodying the present invention.

Referring now particularly to FIG. 27, cable 100 is shown connected to the lowering cable and the latter is secured to the upper end of pipe section PB-B2 by releasable fitting 103, such pipe section being disposed in a generally vertical position forwardly of tower TT. A hang-off clamp HC-2, such as that described hereinbefore, is at this time supporting the upper end of pipeline P. It should be understood that although the construction of the hang-off clamp HC-2 is similar to that described hereinbefore, such clamp need not be movable out of its position of FIG. 27 in alignment with the upper end of pipeline P.

Figure 28:
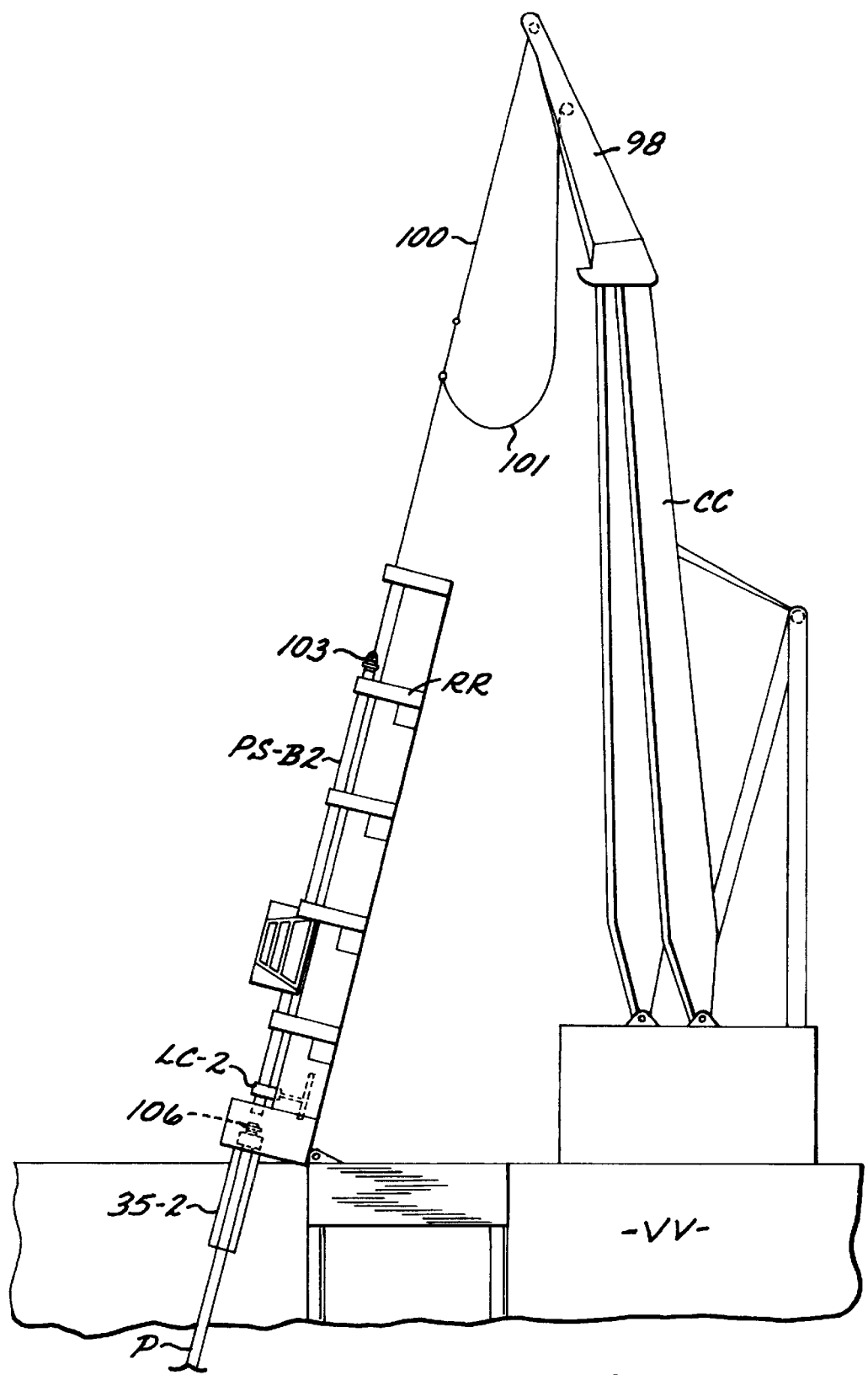
Figure 29:
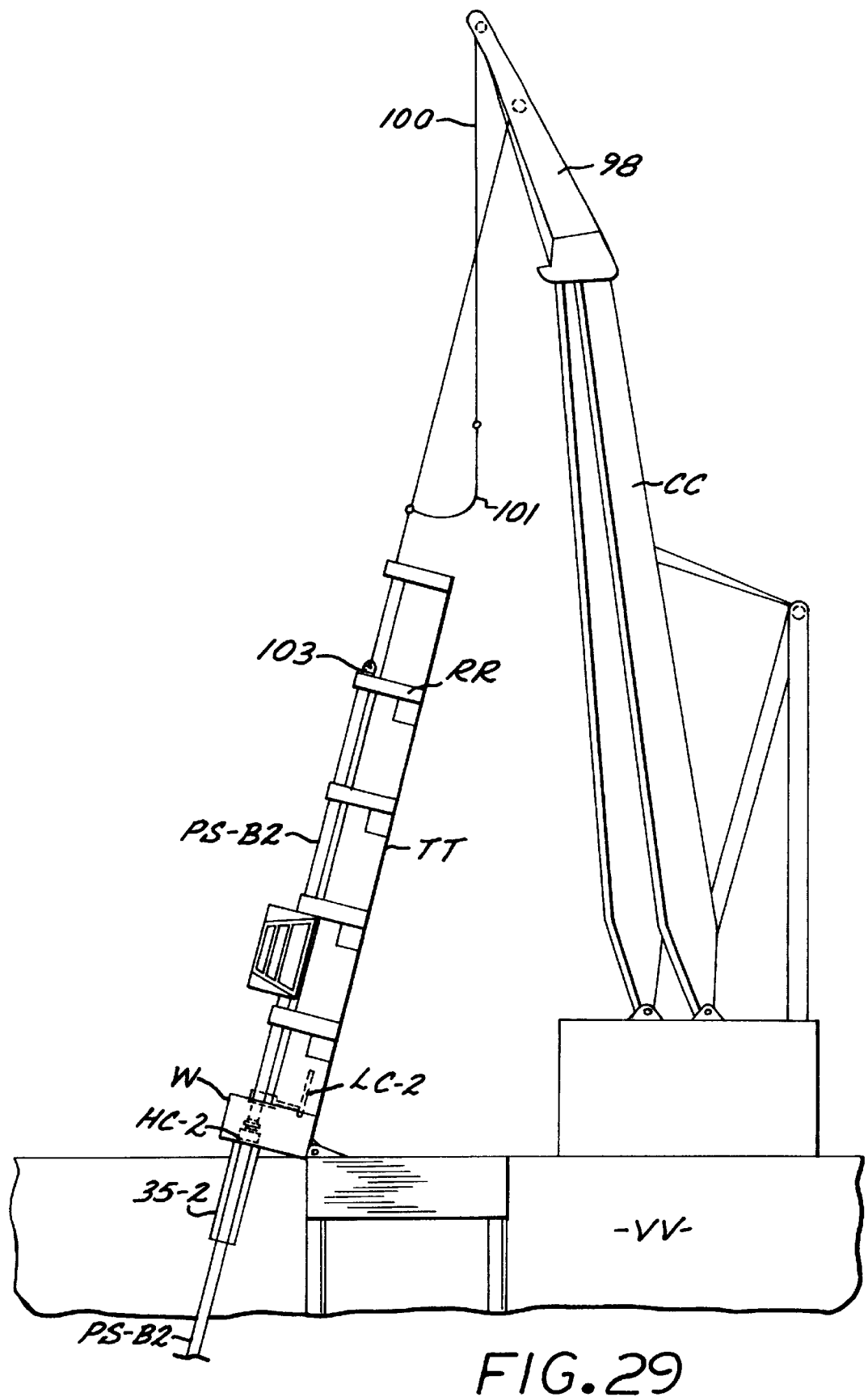
Figure 30:
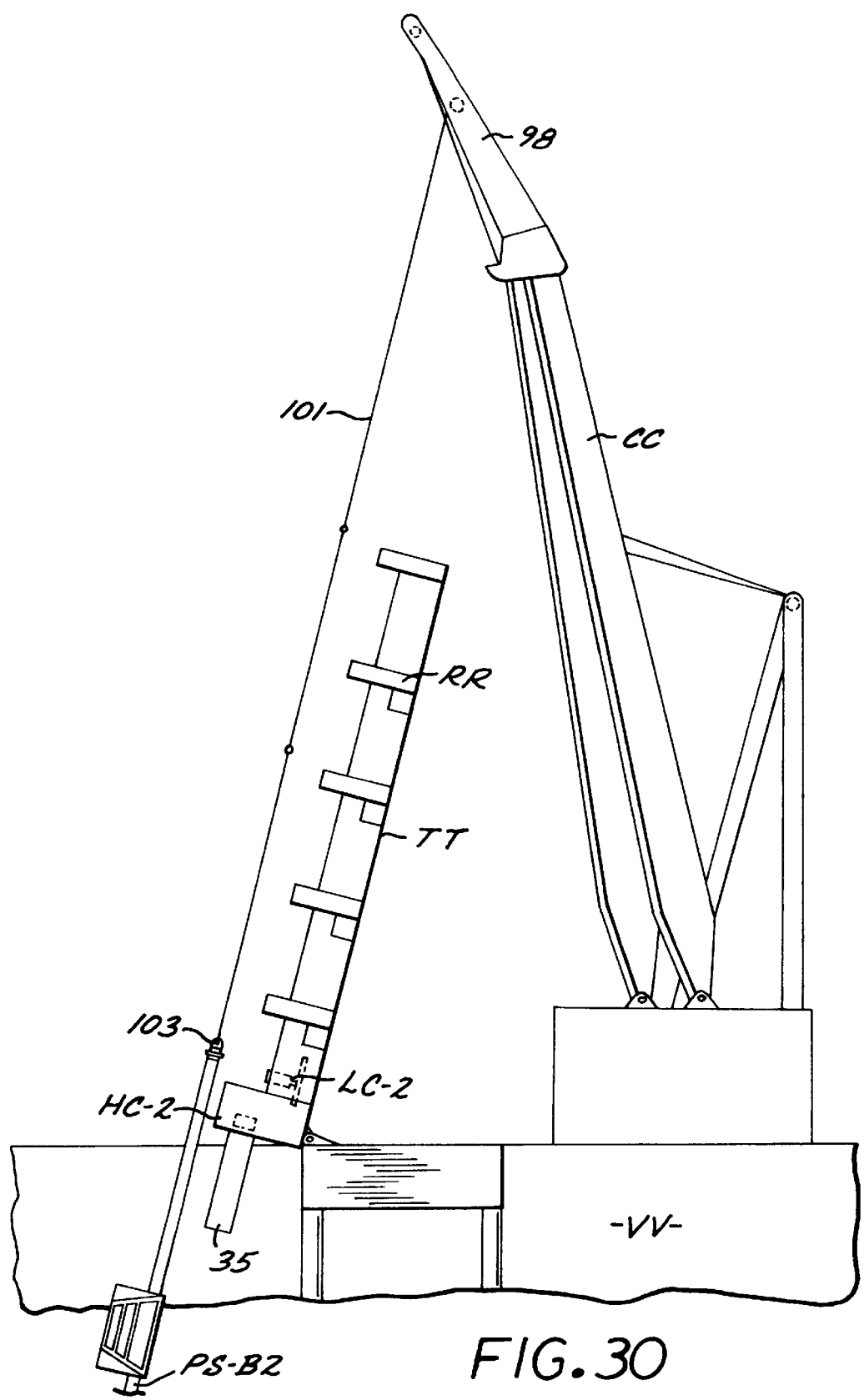
Figure 31:
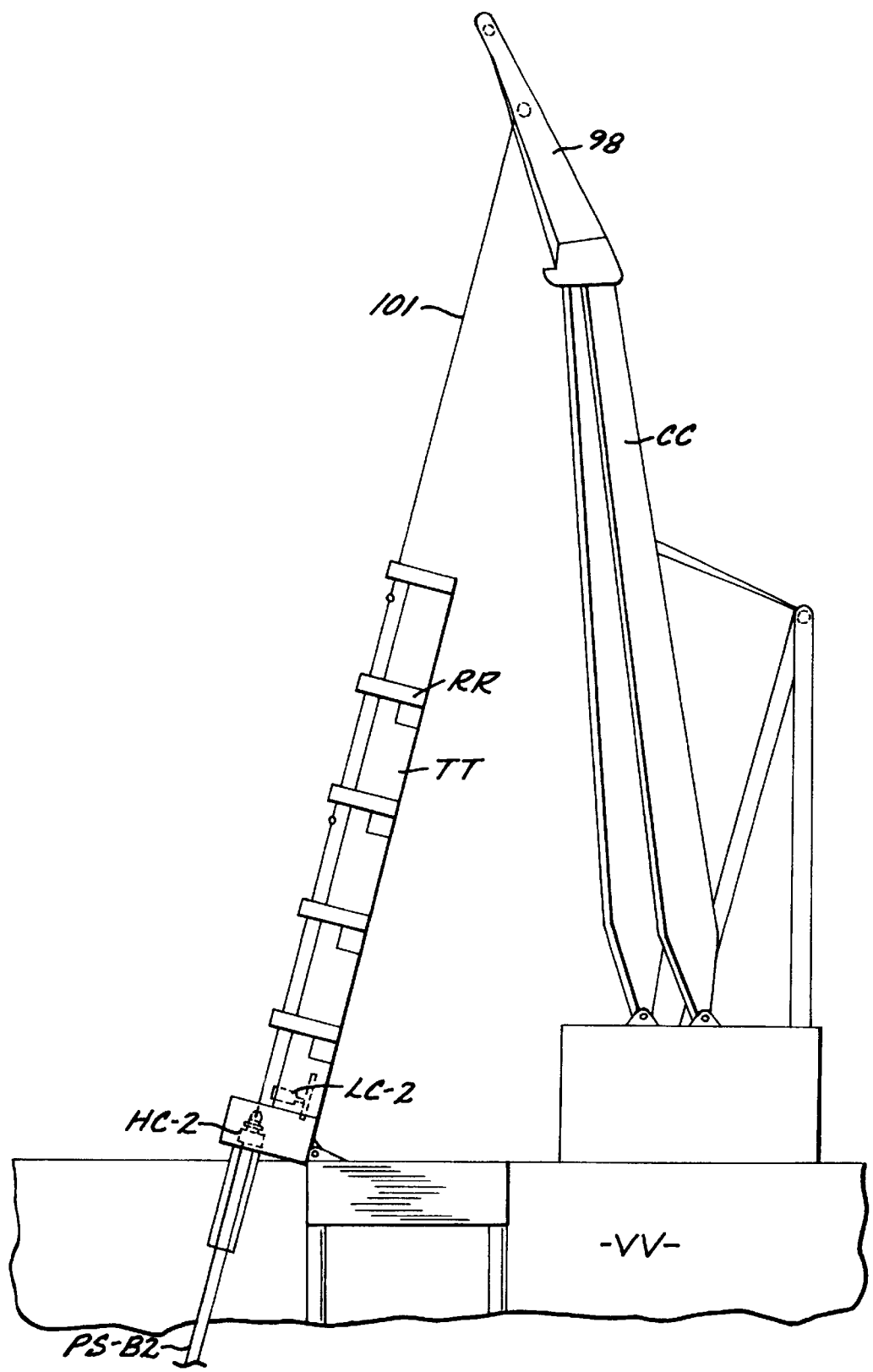

In FIG. 28, the tugger lines 105 shown in FIG. 27 have been utilized to assist the derrick and installation cable 100 in swinging the pipe section PS-B2 into the confines of the guide rollers RR, with the lower end of the pipe section being spaced above and in alignment with the upper end of pipeline P. The tugger lines are then disconnected. Thereafter, as indicated in FIG. 29, installation cable 100 will lower pipe section PS-B2 into line-up clamp LC-2, cable 100 will be slacked off and the line-up clamp lowers such pipe section onto collar 106 (similar to the collar 91 described hereinbefore) secured to the upper end of the uppermost pipe section of pipeline P at welding station W. The lower end of the pipe section PS-B2 is then welded onto collar 106. Tower guide rollers R and hang-off clamp HC-2 are then opened and, as indicated in FIG. 30, the crane swings the pipe section PS-B2 forwardly from its original position in FIGS. 27, 28 and 29. The pipeline guide means and/or tensioner means in the tower's downward extension 35-2 will be opened to permit forward movement of the pipe section. Cable 101 then lowers the pipe section to a position spaced at a predetermined depth forwardly from and clear of any downward extension (not shown) of tower TT. The installation cable 100 can be detached from the lowering cable 101 before the pipe section PS-B2 is lowered into the sea. The next step, is for the derrick and lowering cable 101 to return the upper end of pipe section PS-B2 to the confines of hang-off clamp HC-2, as indicated in FIG. 31. It will be understood that the hang-off clamp will be opened to permit forward movement of such pipe section out of the confines of the clamp and that such clamp will be closed after the upper portion of the pipe section PS-B2 has been returned to the confines of the hang-off clamp. Thereafter, a new pipe section (not shown) may be added to the upper end of pipe section PS-B2 in a continuation of the pipe laying operation in accordance with the aforedescribed description.

While the above-described method and apparatus is suitable for installing single pipe sections, such method and apparatus is also suitable for installing double-walled pipes. Although two particular forms of the invention have been illustrated and described, it will also be apparent to those skilled in the art that various modifications can be made without departing from the spirit and scope of the invention. Accordingly, it is not intended that the invention be limited except by the appended claims.

We claim:

1. A pipe laying method for installing a pipeline utilizing standard pipe sections of generally uniform diameter and at least one non-standard pipe section having a bulky device larger than the diameter of a standard pipe section, the method including the steps of:
   providing a pipe laying vessel equipped with a tower and with hoisting means;
   providing a pipe clamping mechanism at the lower portion of the tower to engage and releasably hold the upper end of the pipeline at a first position;
   attaching the lower end of said non-standard pipe section to the upper end of said pipeline;
   releasably securing the hoisting means to the upper end of said non-standard pipe section;
   disengaging the upper end of the pipeline from the pipe clamping mechanism;
   using the hoisting means to first move the non-standard pipe section and attached pipeline to a second position spaced generally horizontally offset from the point of attachment of said non-standard pipe section to the upper end of the pipeline;
   next using the hoisting means to lower the non-standard pipe section and attached pipeline into the sea wherein the bulky item is positioned at a predetermined location and depth below the tower;
   using the hoisting means to return the upper end of the pipeline to the pipe clamping mechanism;
   engaging the clamping mechanism with the upper end of said non-standard pipe section and attached pipeline; and
   adding the lower end of a standard pipe section to the non-standard upper end of the pipe section disposed in the clamping mechanism.

2. A method as set forth in claim 1 wherein the tower includes a downward extension and said predetermined location and depth is clear of the downward extension.

3. A method as set forth in claim 1, wherein the pipe clamping mechanism is moved away from said first position towards said second position before the upper end of the pipeline is disengaged from the upper end of the pipeline; and
   the clamping mechanism is returned to its original position after the hoisting means returns the upper end of the pipeline to such clamping mechanism.

4. A method as set forth in claim 3, wherein the hoisting means includes a cable that depends from a point located above the tower in general alignment with the pipe clamping mechanism, such cable being releasably attached to the upper end of said pipe section.

5. Apparatus useable with a pipe laying vessel for installing a pipe section having a bulky device larger than the diameter of such pipe section in the upper end of a pipeline, such apparatus comprising:
   a tower on the vessel;
   a welding station at the lower portion of the tower;
   a pipe clamping mechanism at the lower portion of the tower to selectively engage and releasable hold the upper end of the pipeline;
   hoisting means on the vessel selectively engageable with the upper end of said pipe section to support said pipe section on the tower as the lower end of the pipe section is attached to the upper end of said pipeline at the welding station;
   whereafter the pipeline is disengaged from the pipe clamping mechanism and the hoisting means moves the pipe section and attached pipeline generally horizontally to a position offset from the pipe clamping mechanism, the hoisting means then lowering the pipe section until the upper end thereof is positioned above the pipe damping mechanism with the attached pipeline being submerged into the sea with the bulky item being positioned at a predetermined depth below the tower; and
   the hoisting mechanism then returning the upper end of the pipe section to the pipe clamping mechanism.

6. Apparatus as set forth in claim 5 wherein the tower includes a downward extension and said predetermined location and depth is clear of the downward extension.

7. Apparatus as set forth in claim 5 wherein the tower is provided with tower guide rollers that releasably receive said pipe section as the lower end of said pipe section is attached to the upper end of the pipeline.

8. Apparatus as set forth in claim 5 wherein the hoisting means includes a tugger line that moves said pipe section into the lower guide rollers and cable means that support the weight of said pipe section and pipeline.

9. A method for attaching a pipe section having a bulky device larger than the diameter of such pipe section to the upper end of a pipeline, said method including the steps of:
   providing a pipe laying vessel equipped with a tower and with hoisting means;
   providing a pipe clamping mechanism at the lower portion of the tower to engage and releasably hold the upper end of the pipeline at a first position in the lower part of the tower;
   attaching the lower end of said pipe section held in the pipe clamping mechanism to the upper end of said pipeline;
   releasably securing the hoisting means to the upper end of said pipe section;
   disengaging the upper end of the pipeline from the pipe clamping mechanism;
   using the hoisting meals to first move the pipe section and attached pipeline to a second position spaced, generally horizontally offset from said first position;
   next using the hoisting means to lower said pipe section and attached pipeline into the sea wherein the bulky item is positioned at a predetermined location and depth below the tower;
   then using the hoisting means to return the upper end of said pipe section to the said first position; and
   engaging the pipe clamping mechanism with the upper end of said pipe section and attached pipeline.

10. A method as set forth in claim 9 wherein the tower includes a downward extension and said predetermined location and depth is clear of the downward extension.

11. A method as set forth in claim 10 wherein there is also provided a line-up clamp at the lower portion of the tower which lowers said pipe section onto the upper end of the pipeline whereby the lower end of said pipe section can be attached to the upper end of the pipeline.

12. A method as set forth in claim 10 wherein the hoist includes a cable that depends from a point located above the tower in general alignment with the pipe clamping mechanism, such cable being releasably attached to the upper end of said pipe section.

13. A method as set forth in claim 12, wherein the pipe clamping mechanism is moved away from said first position towards said second position before the upper end of the pipeline is disengaged from the upper end of the pipeline; and
   the pipe clamping mechanism is returned to its original position after the hoisting means returns the upper end of the pipeline to such clamping mechanism.

14. Apparatus usable with a pipe laying vessel for installing a non-standard pipe section containing a bulky device having a diameter larger than the diameter of a standard pipe section in a pipeline, said apparatus including:
   a tower carried by the vessel in a near vertical position, said tower including two columns defining a tower opening therebetween;
   a pipe supply on the vessel;
   a strongback adjacent the tower and having its rear end slidably connected to one of the columns for movement between a generally horizontal pipe section pick-up position and a near vertical pipe section hand-off position adjacent said one of the columns;
   grippers on the strongback that pick-up said non-standard pipe section from the pipe supply at the pick-up position and swing said pipe section into the tower opening at the hand-off position;
   tower rollers in the upper portion of the tower adjacent the hand-off position movable between an open position and a closed position, said rollers receiving the upper end of said non-standard pipe section from the grippers while disposed in an open position whereafter the tower rollers are moved into their closed position;
   a hang-off clamp in the lower portion of the tower selectively operable between a closed first position wherein it supports the pipeline-attached pipe section forming the top portion of the pipeline and a second open position wherein the pipeline-attached section and pipeline can be lowered relative to the tower;
   a line-up clamp in the lower portion of the tower above the hang-off clamp, said line-up clamp receiving the lower portion of said non-standard pipe section from the grippers as said pipe section is moved into the hand-off position, said line-up clamp then engaging said pipe section to lower said pipe section onto the upper end of the pipeline-attached pipe section for attachment of the latter to said pipe section, with the strongback then immediately returning to its pick-up position for the grippers to engage a new pipe section at the pipe supply to be added to the upper end of said pipe section while said non-standard pipe section is being attached to the upper end of the pipeline; and
   hoisting means releasably securable to the upper end of said non-standard pipe section to lower said pipe section and pipeline to a position horizontally offset from the line-up clamp after the lower end of said pipe section has been attached to the pipeline, with the hang-off clamp then being disposed in its open position.

15. Apparatus as set forth in claim 14 wherein the tower rollers include a pair of roller supporting arms movable between a spaced apart open position and a retracted closed position.

16. Apparatus as set forth in claim 15 wherein the line-up clamp includes a vertically extending cylinder and plunger unit secured to the tower, such unit carrying slip means releasably engageable with the pipe section.

17. Apparatus as set forth in claim 16 wherein the line-up clamp includes a vertically extending cylinder and plunger unit secured to the tower, such unit carrying slip means releasably engageable with the pipe section.

18. Apparatus usable with a pipe laying vessel for installing a submerged pipeline utilizing a pipe section, said apparatus including:
   a tower carried by the vessel in a near vertical position, said tower including two columns defining a tower opening therebetween;
   a pipe supply on the vessel;
   a strongback adjacent the tower and having its rear end slidably connected to one of the columns for movement between a generally horizontal pipe section pick-up position and a near vertical pipe section hand-off position adjacent said one of the columns;
   grippers on the strongback that pick-up said pipe section from the pipe supply at the pick-up position and swing said pipe section into the tower opening at the hand-off position;
   tower rollers in the upper portion of the tower adjacent the hand-off position movable between an open position and a closed position, said rollers receiving the upper end of said pipe section from the grippers while disposed in an open position whereafter the tower rollers are moved into their closed position;

a hang-off clamp in the lower portion of the tower selectively operable between a closed first position wherein it supports the pipeline-attached pipe section forming the top portion of the pipeline and a second open position wherein the pipeline-attached section and pipeline can be lowered relative to the tower;

a line-up clamp in the lower portion of the tower above the hang-off clamp, said line-up clamp receiving the lower portion of said pipe section from the grippers as said pipe section is moved into tho hand-off position, said line-up clamp then engaging said pipe section to lower said pipe section onto the upper end of the pipeline-attached pipe section for attachment of the latter to said pipe section, with the strongback then immediately returning to its pick-up position for the grippers to engage a new pipe section at the pipe supply to be added to the upper end of said pipe section while said pipe section is being attached to the upper end of the pipeline; and hoisting means releasably securable to the upper end of said pipe section to lower said pipe section and pipeline to a position generally horizontally offset from the line-up clamp after the lower end of said pipe section has attached to the pipeline, with the bang-off clamp then being disposed in its open position.

19. Apparatus as set forth in claim 18 wherein the tower rollers include a pair of roller supporting arms movable between a spaced apart open position and a retracted closed position.

20. Apparatus as set forth in claim 18 wherein the line-up clamp includes a vertically extending cylinder and plunger unit secured to the tower, such unit carrying slip means releasably engageable with the pipe section.

* * * * *